United States Patent
Kondo et al.

(10) Patent No.: US 10,977,108 B2
(45) Date of Patent: Apr. 13, 2021

(54) INFLUENCE RANGE SPECIFYING METHOD, INFLUENCE RANGE SPECIFYING APPARATUS, AND STORAGE MEDIUM

(71) Applicant: FUJITSU LIMITED, Kanagawa (JP)

(72) Inventors: Reiko Kondo, Yamato (JP); Yukihiro Watanabe, Kawasaki (JP); Hiroshi Otsuka, Kawasaki (JP); Masahiro Asaoka, Kawasaki (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 139 days.

(21) Appl. No.: 16/290,454

(22) Filed: Mar. 1, 2019

(65) Prior Publication Data

US 2019/0196897 A1 Jun. 27, 2019

Related U.S. Application Data

(63) Continuation of application No. PCT/JP2017/046678, filed on Dec. 26, 2017.

(30) Foreign Application Priority Data

Jan. 18, 2017 (JP) .............................. JP2017-006312

(51) Int. Cl.
*G06F 11/07* (2006.01)
*G06F 11/32* (2006.01)
(Continued)

(52) U.S. Cl.
CPC .......... *G06F 11/0772* (2013.01); *G06F 11/07* (2013.01); *G06F 11/0709* (2013.01);
(Continued)

(58) Field of Classification Search
CPC .. G06F 11/0772; G06F 11/07; G06F 11/0709; G06F 11/0751; G06F 11/34; G06F 11/32; H04L 41/0631; H04L 43/065
See application file for complete search history.

(56) References Cited

U.S. PATENT DOCUMENTS

2005/0278273 A1* 12/2005 Uthe ................... H04L 41/0631
2005/0283680 A1 12/2005 Kobayashi et al.
(Continued)

FOREIGN PATENT DOCUMENTS

JP 2006-4346 1/2006
JP 2006-178834 7/2006
(Continued)

OTHER PUBLICATIONS

International Search Report attached with the Written Opinion of the International Searching Authority, mailed in connection with PCT/JP2017/046678 and dated Apr. 3 2018, with partial English translation (11 pages).

*Primary Examiner* — Yolanda L Wilson
(74) *Attorney, Agent, or Firm* — Fujitsu Patent Center

(57) ABSTRACT

A non-transitory computer-readable storage medium storing a program that causes a computer to execute a process, the process includes determining an information transmission path between two devices with a correlation in use status of resources based on system configuration information and use resource information; generating, for each of a plurality of software, an influence propagation model in which a direction from a first device to a second device is set as an influence propagation direction, when a co-occurrence probability that the second device outputs a message within a certain time after the first device outputs a message through execution of the software is equal to or greater than a threshold, based on a message log; acquiring failure information indicating a failed device; specifying an influenced (Continued)

device reached by tracing the information transmission path from the failed device in an influence propagation direction; and outputting information indicating the influenced device.

9 Claims, 31 Drawing Sheets

(51) Int. Cl.
*G06F 11/34* (2006.01)
*H04L 12/26* (2006.01)
*H04L 12/24* (2006.01)

(52) U.S. Cl.
CPC .......... *G06F 11/0751* (2013.01); *G06F 11/32* (2013.01); *G06F 11/34* (2013.01); *H04L 41/0631* (2013.01); *H04L 43/065* (2013.01); *H04L 41/0654* (2013.01); *H04L 41/22* (2013.01)

(56) References Cited

U.S. PATENT DOCUMENTS

| | | | |
|---|---|---|---|
| 2006/0041659 A1* | 2/2006 | Hasan | H04L 41/0631 709/224 |
| 2007/0177523 A1 | 8/2007 | Nagami et al. | |
| 2008/0004841 A1 | 1/2008 | Nakamura | |
| 2010/0070795 A1* | 3/2010 | Shimada | H04L 67/125 714/2 |
| 2011/0145647 A1 | 6/2011 | Hidaka et al. | |
| 2011/0161743 A1 | 6/2011 | Kato | |
| 2011/0191630 A1* | 8/2011 | Li | G06F 11/07 714/25 |
| 2013/0042139 A1* | 2/2013 | Bhalerao | G06F 11/0709 714/2 |
| 2015/0033084 A1* | 1/2015 | Sasturkar | G06F 16/24578 714/46 |
| 2015/0312141 A1 | 10/2015 | Sato | |
| 2015/0355959 A1* | 12/2015 | Kogan-Katz | G06F 11/0736 714/57 |
| 2017/0024271 A1* | 1/2017 | Teli | G06F 11/30 |
| 2017/0075749 A1* | 3/2017 | Ambichl | G06F 11/0748 |
| 2017/0123885 A1* | 5/2017 | Margalit | G06F 11/321 |

FOREIGN PATENT DOCUMENTS

| | | |
|---|---|---|
| JP | 2007-235897 | 9/2007 |
| JP | 2008-3709 | 1/2008 |
| JP | 2008-9842 | 1/2008 |
| JP | 2010-9411 | 1/2010 |
| JP | 2015-211374 | 11/2015 |
| WO | 2010/016239 | 2/2010 |
| WO | 2010/032701 | 3/2010 |

* cited by examiner

FIG. 6
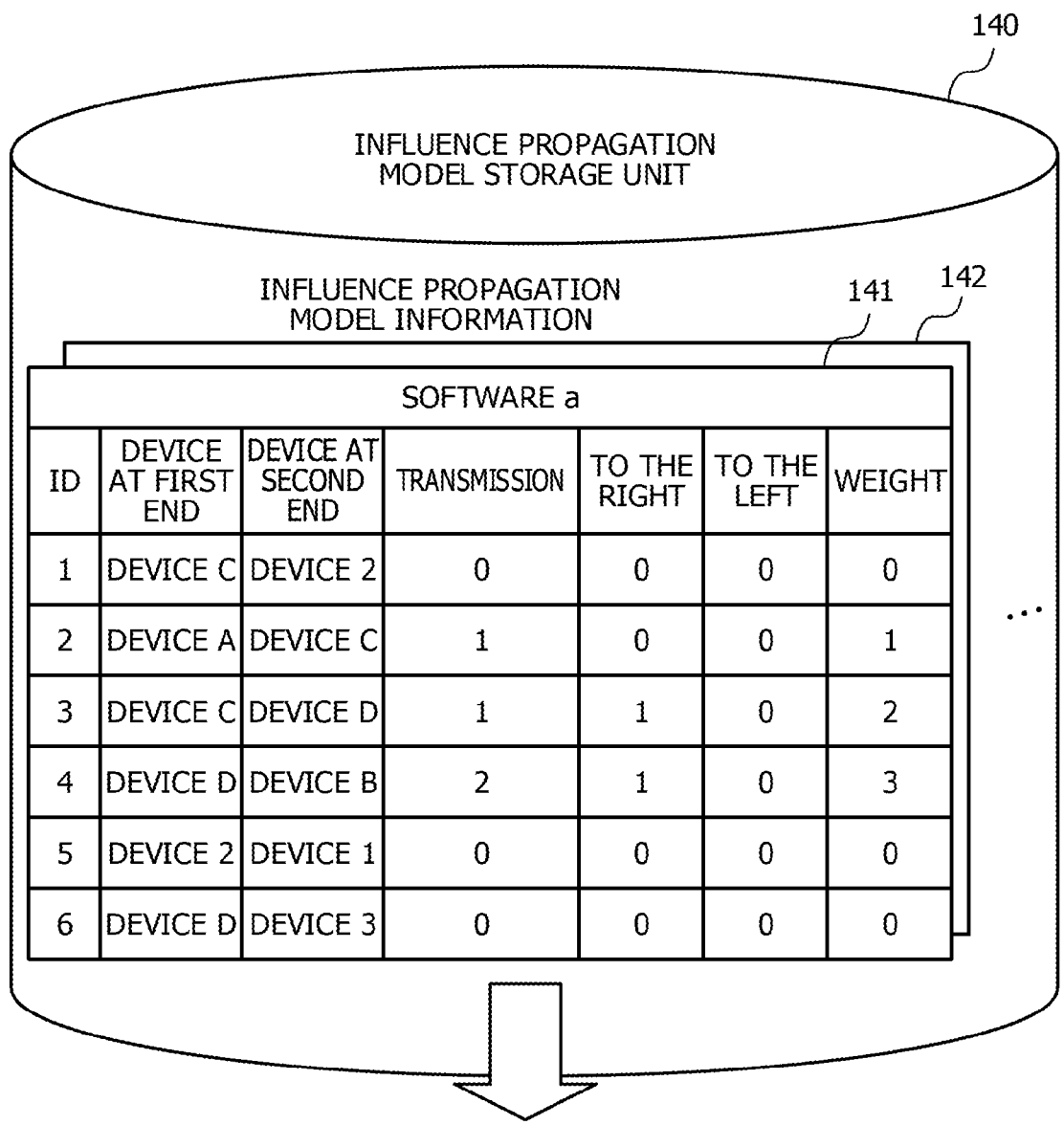
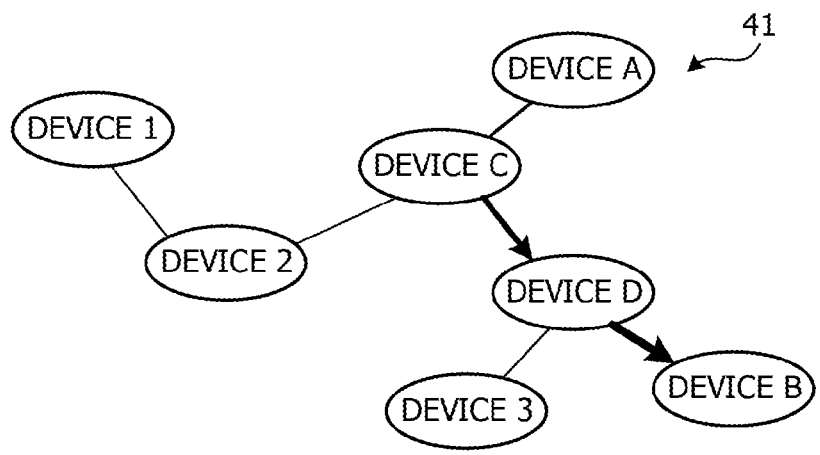

FIG. 9
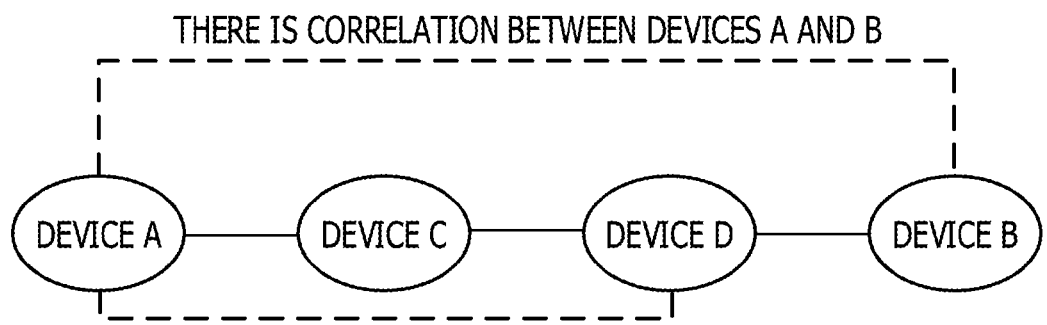
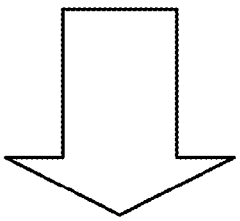
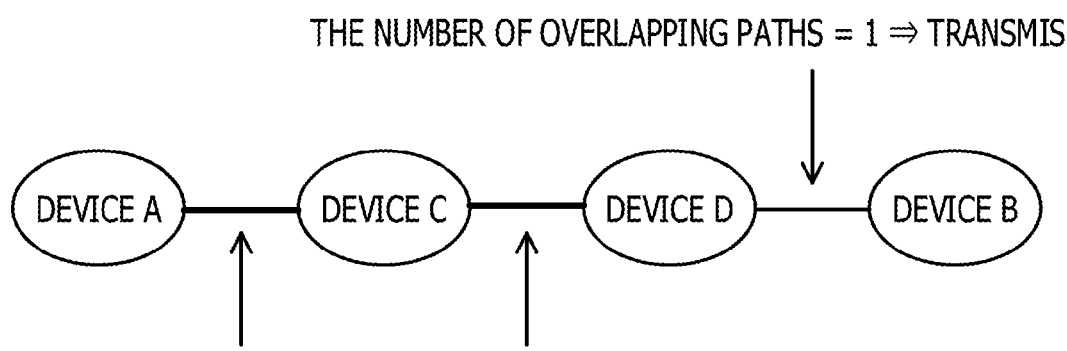

| SOFTWARE a | | | |
|---|---|---|---|
| TIME | OUTPUT DEVICE | KIND OF MESSAGE | CONTENT OF MESSAGE |
| 2016-12-01 10:31:02 | DEVICE A | SV0425 | ServerView RAID, 0, 10526, ... |
| 2016-12-01 10:35:28 | DEVICE C | PP0099 | machine4:FJSVcsl:A:Rack#0-PCI... |
| 2016-12-01 21:00:18 | DEVICE D | SV0188 | Adapter FTS RAID Ctrl SAS 6G... |
| ⋮ | ⋮ | ⋮ | ⋮ |

⬇ CO-OCCURRENCE ANALYSIS

50

| SOFTWARE a | | | |
|---|---|---|---|
| CO-OCCURRENCE ID | FIRST MESSAGE OUTPUT DEVICE | SECOND MESSAGE OUTPUT DEVICE | CO-OCCURRENCE PROBABILITY |
| 1 | DEVICE A | DEVICE C | 0.077 |
| 2 | DEVICE C | DEVICE D | 0.99 |
| 3 | DEVICE D | DEVICE B | 0.67 |
| ⋮ | ⋮ | ⋮ | ⋮ |

> 0.7

⬇

SOFTWARE a

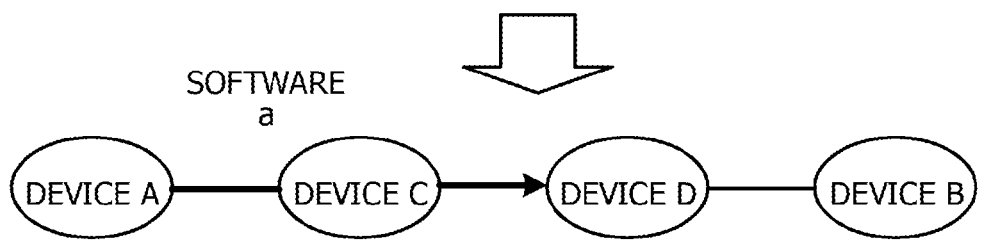

THERE IS CO-OCCURRENCE RELATIONSHIP
⟶
INFLUENCE PROPAGATION DIRECTION

FIG. 16
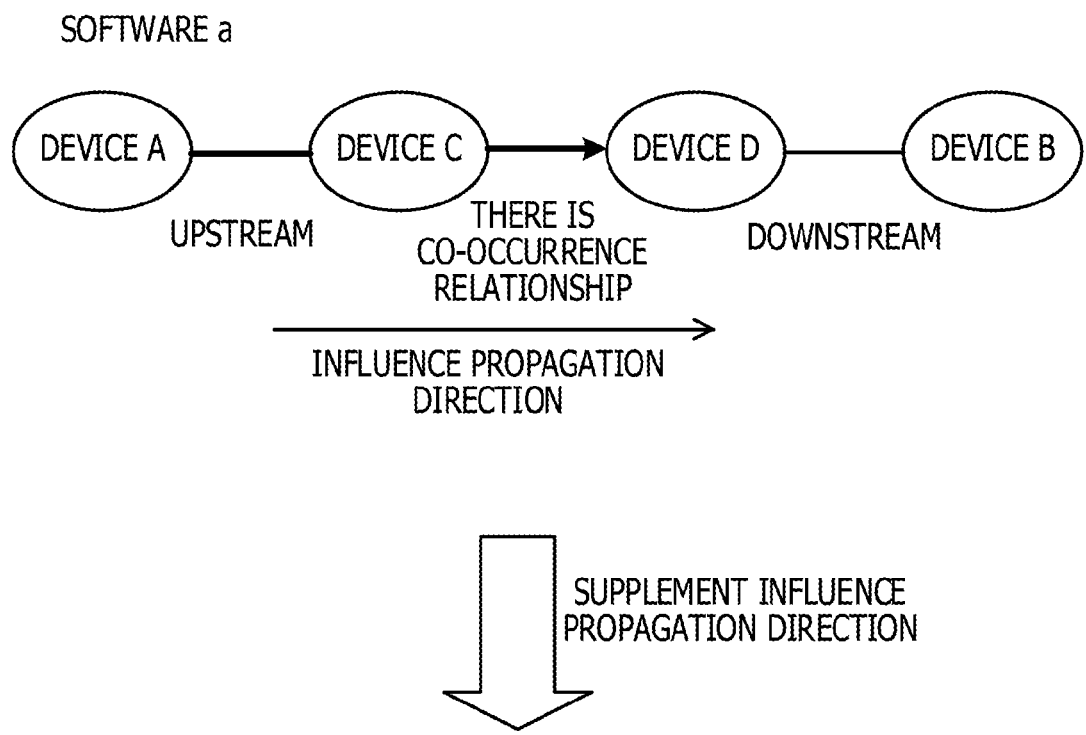
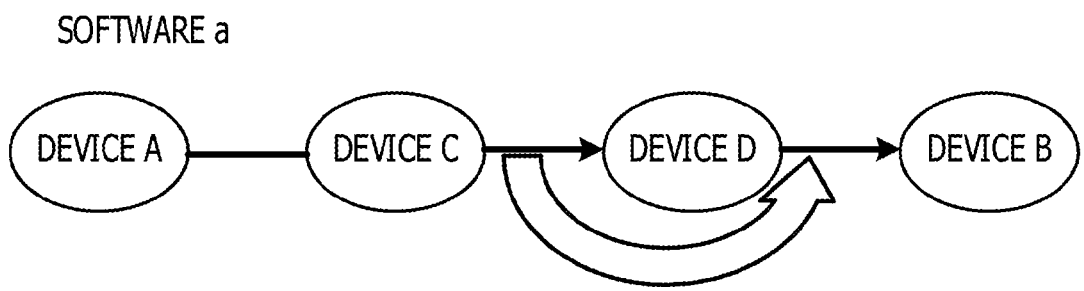

FIG. 17
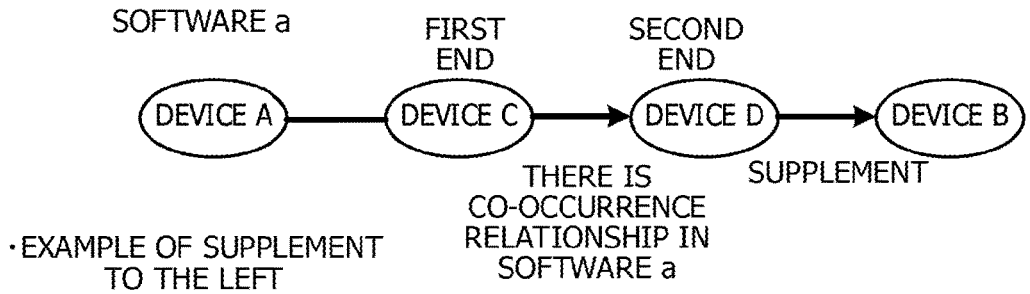
- EXAMPLE OF SUPPLEMENT TO THE RIGHT
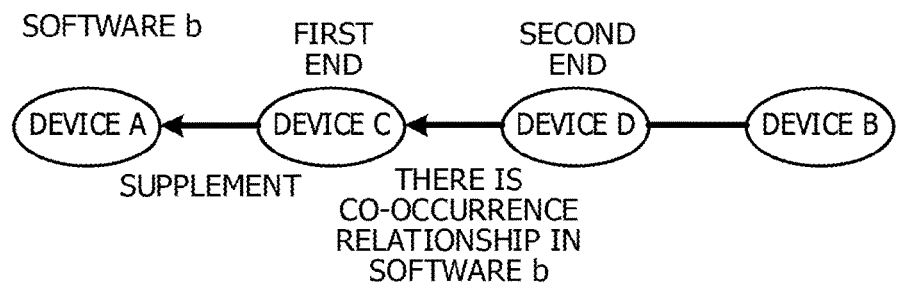
- EXAMPLE OF SUPPLEMENT TO THE LEFT
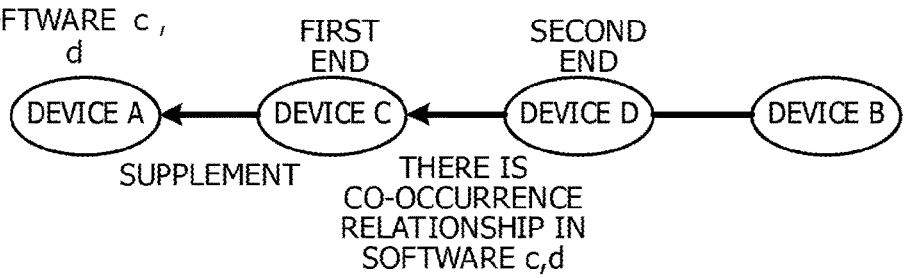
- EXAMPLE OF SUPPLEMENTING INFLUENCE PROPAGATION DIRECTION OF A PLURALITY OF PIECES OF SOFTWARE
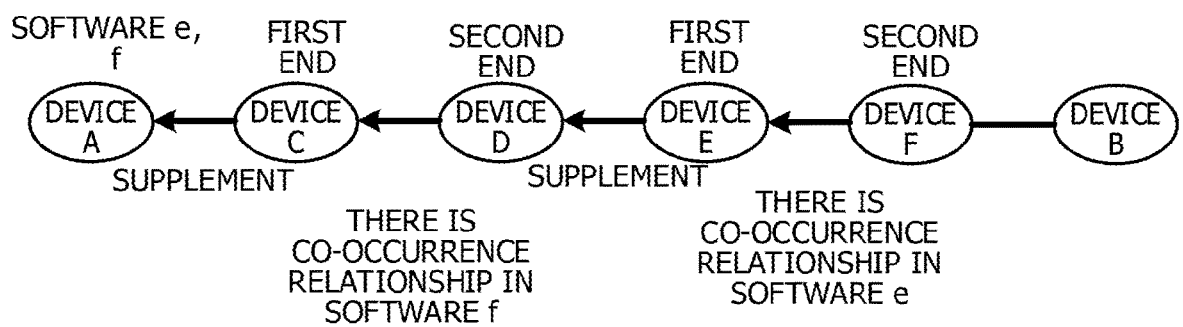
- EXAMPLE OF SUPPLEMENTING INFLUENCE PROPAGATION DIRECTION OF A PLURALITY OF PIECES OF SOFTWARE COOPERATING WITH EACH OTHER

FIG. 18B 141, 142

SOFTWARE a

TO S301 →

| ID | DEVICE AT FIRST END | DEVICE AT SECOND END | TRANSMISSION | TO THE RIGHT | TO THE LEFT |
|---|---|---|---|---|---|
| 1 | DEVICE C | DEVICE 2 | 0 | 0 | 0 |
| 2 | DEVICE A | DEVICE C | 1 | 0 | 0 |
| 3 | DEVICE C | DEVICE D | 1 | 1 | 0 |
| 4 | DEVICE D | DEVICE B | 2 | 0 | 0 |
| ⋮ | ⋮ | ⋮ | ⋮ | ⋮ | ⋮ |

141, 142

SOFTWARE a

FROM S306 →

| ID | DEVICE AT FIRST END | DEVICE AT SECOND END | TRANSMISSION | TO THE RIGHT | TO THE LEFT |
|---|---|---|---|---|---|
| 1 | DEVICE C | DEVICE 2 | 0 | 0 | 0 |
| 2 | DEVICE A | DEVICE C | 1 | 0 | 0 |
| 3 | DEVICE C | DEVICE D | 1 | 1 | 0 |
| 4 | DEVICE D | DEVICE B | 2 | 1 | 0 |
| ⋮ | ⋮ | ⋮ | ⋮ | ⋮ | ⋮ |

TO S321 ←

| | | | SOFTWARE a 141 142 | | |
|---|---|---|---|---|---|
| ID | DEVICE AT FIRST END | DEVICE AT SECOND END | TRANSMISSION | TO THE RIGHT | TO THE LEFT |
| 1 | DEVICE C | DEVICE 2 | 0 | 0 | 0 |
| 2 | DEVICE A | DEVICE C | 1 | 0 | 0 |
| 3 | DEVICE C | DEVICE D | 1 | 1 | 0 |
| 4 | DEVICE D | DEVICE B | 2 | 0 | 0 |
| ⋮ | ⋮ | ⋮ | ⋮ | ⋮ | ⋮ |

FROM S324

| | | | SOFTWARE a 141 142 | | | |
|---|---|---|---|---|---|---|
| ID | DEVICE AT FIRST END | DEVICE AT SECOND END | TRANSMISSION | TO THE RIGHT | TO THE LEFT | WEIGHT |
| 1 | DEVICE C | DEVICE 2 | 0 | 0 | 0 | 0 |
| 2 | DEVICE A | DEVICE C | 1 | 0 | 0 | 1 |
| 3 | DEVICE C | DEVICE D | 1 | 1 | 0 | 2 |
| 4 | DEVICE D | DEVICE B | 2 | 1 | 0 | 3 |
| ⋮ | ⋮ | ⋮ | ⋮ | ⋮ | ⋮ | ⋮ |

FIG. 24B

TO S415 ←  
FROM S414 →

141  142

| | | | SOFTWARE a | | | |
|---|---|---|---|---|---|---|
| ID | DEVICE AT FIRST END | DEVICE AT SECOND END | TRANSMISSION | TO THE RIGHT | TO THE LEFT | WEIGHT |
| 1 | DEVICE C | DEVICE 2 | 0 | 0 | 0 | 0 |
| 2 | DEVICE A | DEVICE C | 1 | 0 | 0 | 1 |
| 3 | DEVICE C | DEVICE D | 1 | 1 | 0 | 2 |
| 4 | DEVICE D | DEVICE B | 2 | 1 | 0 | 3 |
| ⋮ | ⋮ | ⋮ | ⋮ | ⋮ | ⋮ | ⋮ |

FIG. 25B

| | | SOFTWARE a | | | | |
|---|---|---|---|---|---|---|
| ID | DEVICE AT FIRST END | DEVICE AT SECOND END | TRANSMISSION | TO THE RIGHT | TO THE LEFT | WEIGHT |
| 1 | DEVICE C | DEVICE 2 | 0 | 0 | 0 | 0 |
| 2 | DEVICE A | DEVICE C | 1 | 0 | 0 | 1 |
| 3 | DEVICE C | DEVICE D | 1 | 1 | 0 | 2 |
| 4 | DEVICE A | DEVICE B | 2 | 1 | 0 | 3 |
| ⋮ | ⋮ | ⋮ | ⋮ | ⋮ | ⋮ | ⋮ |

141  142

TO S432

FIG. 26
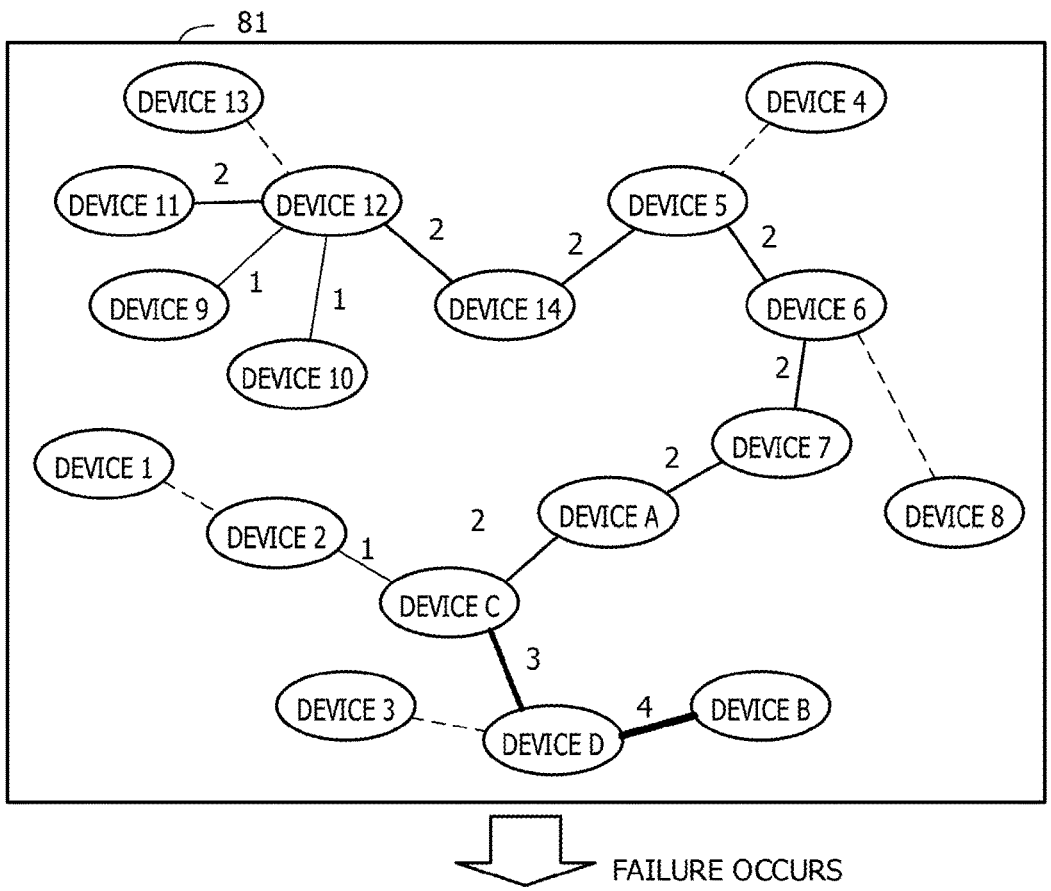
FAILURE OCCURS
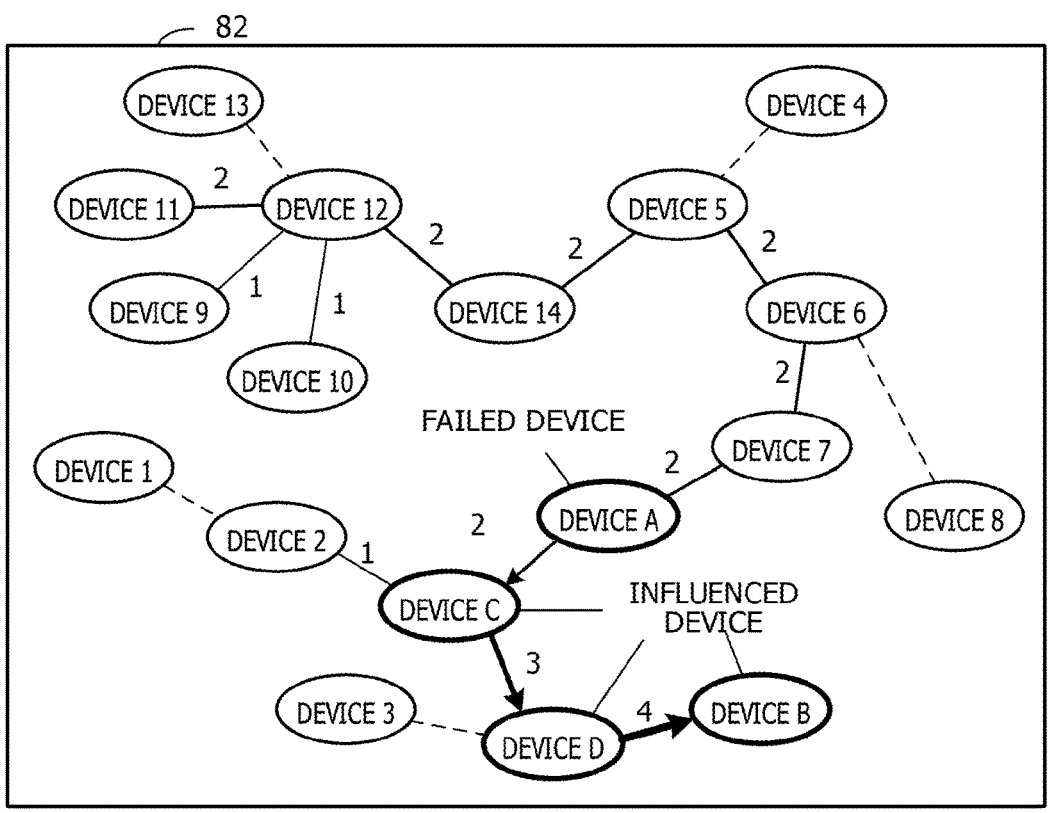

INFLUENCE RANGE SPECIFYING METHOD, INFLUENCE RANGE SPECIFYING APPARATUS, AND STORAGE MEDIUM

CROSS-REFERENCE TO RELATED APPLICATION

This application is a continuation application of International Application PCT/JP2017/046678, filed on Dec. 26, 2017 and designated the U.S., the entire contents of which are incorporated herein by reference. The International Application PCT/JP2017/046678 is based upon and claims the benefit of priority of the prior Japanese Patent Application No. 2017-006312, filed on Jan. 18, 2017, the entire contents of which are incorporated herein by reference.

FIELD

The embodiments discussed herein are related to an influence range specifying method, an influence range specifying apparatus, and a storage medium.

BACKGROUND

Many of devices coupled to a computer network system cooperate with other devices, and the state of a device may depend on the state of another device. Therefore, when a failure occurs in a device of the system, a device dependent on the device is also influenced. The influenced device may operate slower than usual or may not be able to operate. For example, when a device A is a server, and a device B is a client of the server, the operation state of the device B depends on the operation state of the device A. When the device A stops due to a failure, the device B may not be able to perform normal operation. For example, a large number of devices depend on each other in a large-scale system. Therefore, a failure in a device affects the device and a device directly coupled to the device, and besides, a large number of other devices.

Under the circumstances, when a failure occurs, it is important to promptly notify a user or a system administrator of the influenced devices and the influence range.

Whether there is an influence relationship between devices in the system may be determined based on, for example, whether there is a correlation between the devices regarding the use status of resources. For example, when the timing of an increase in the load of the central processing unit (CPU) coincides in two apparatuses, there is a correlation between the two apparatuses regarding the use status of the CPU. It is likely that one of the two apparatuses depends on the other.

Alternatively, whether the devices are in the influence relationship may also be determined based on a co-occurrence relationship of logs. For example, when two apparatuses output messages, such as error logs, at substantially the same timing, the apparatuses are in the co-occurrence relationship of logs. It is likely that one of the two apparatuses in the co-occurrence relationship of logs depends on the other.

An example of a technique related to investigation of the influence relationship between apparatuses includes a failure analyzing apparatus that specifies a failure-causing functional element that is a functional element predicted to be causing a system failure. There is also an operation managing apparatus that enables to present a failed part and a cause of the failed part in an understandable way. Furthermore, there is also a dependency information collecting system that automatically collects and stores dependency information between devices or services to reduce the load of managing the dependency and that is also configured to specify a device influenced upon failure or the like and to figure out the importance of the failure. There is also a control method of a high-availability computer system that executes a failure prevention and recovery process. In the control method, the effect and the influence of the failure prevention and recovery process are taken into account to determine whether to execute the process or to optimize the execution order of the process. In addition, there is also an information processing system that accurately specifies a tenant and a communication path influenced by a failure when a failure occurs.

Examples of disclosed related art include International Publication Pamphlet No. WO2010/016239, International Publication Pamphlet No. WO2010/032701, Japanese Laid-open Patent Publication No. 2006-178834, Japanese Laid-open Patent Publication No. 2008-009842, and Japanese Laid-open Patent Publication No. 2015-211374.

However, the difference in dependency between devices regarding each piece of software is not taken into account in the related art, and the influence range of a failure of software may not be properly specified. For example, even when a failure of a piece of software propagates from the device A to the device B, a failure of another piece of software may propagate from the device B to the device A. The influence range of a failure in a piece of software may not be accurately specified by determining the influence range of the failure without considering the difference in propagation direction of the influence of failure regarding each piece of software. In view of the foregoing, it is desirable to be able to accurately specify the influence range of a failure of software.

SUMMARY

According to an aspect of the embodiments, a non-transitory computer-readable storage medium storing a program that causes a computer to execute a process, the process includes determining a communication path between two devices with a correlation in use status of resources as an information transmission path based on system configuration information indicating a coupling relationship between a plurality of devices included in a network and based on use resource information indicating temporal variation in the use status of the resources of each of the plurality of devices; generating, for each of a plurality of software, an influence propagation model in which a direction from a first device on the information transmission path to a second device adjacent to the first device is set as an influence propagation direction of a failure of the software in the information transmission path, when a co-occurrence probability indicating a probability that the second device outputs a message through execution of the software within a certain time after the first device outputs a message through execution of the software is equal to or greater than a threshold, based on a message log storing messages output by the plurality of devices through execution of the plurality of software, respectively; acquiring failure information indicating a failed device in which a failure occurs in one of software among the plurality of software; specifying, as an influenced device influenced by the failure in the failed device, a device reached by tracing the information transmission path from the failed device in the influence propagation direction indicated in the influence propagation model of the one of software; and outputting information indicating the influenced device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 depicts an example of information stored in an influence propagation model storage unit;

FIG. 9 depicts an example in which information transmission paths overlap;

FIG. 13 depicts an example of determining an influence propagation direction;

FIG. 16 depicts an example of supplementing an influence propagation direction;

FIG. 17 depicts examples of supplement patterns of an influence propagation direction;

FIGS. 18A and 18B are flow charts illustrating an example of a procedure of an influence propagation direction supplementing process;

FIGS. 24A and 24B are flow charts illustrating an example of a procedure of an influence range searching process;

FIGS. 25A and 25B are flow charts illustrating an example of a procedure of a searching process;

FIG. 26 depicts an example of displaying an influence range of failure; and

DESCRIPTION OF EMBODIMENTS

Embodiments will now be described with reference to the drawings. A plurality of embodiments may be combined within a compatible range to carry out each embodiment. The term of "influence" used in the following explanation is sometimes called "failure impact".

First Embodiment

A first embodiment will be described.

Figure 1:
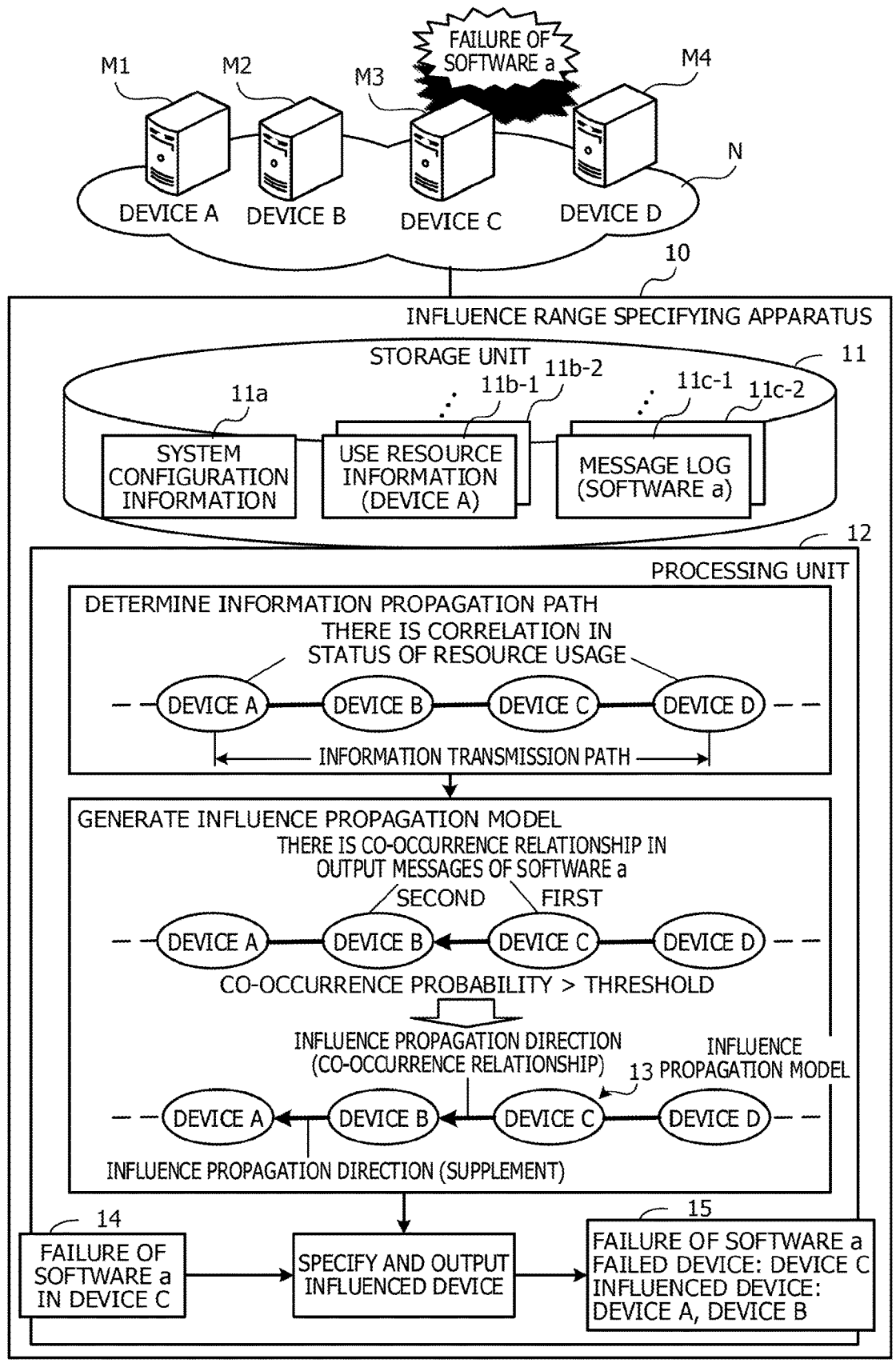
FIG. 1 depicts a configuration example of a system according to a first embodiment.

FIG. 1 depicts a configuration example of a system according to the first embodiment. An influence range specifying apparatus 10 is coupled to a network N including a plurality of devices M1 to M4. The influence range specifying apparatus 10 is an apparatus that specifies an influence range of a failure when a failure occurs in software executed by any one of the devices. The influence range specifying apparatus 10 is, for example, a computer that executes an influence range specifying program describing a processing procedure for specifying the influence range of the failure.

The influence range specifying apparatus 10 includes a storage unit 11 and a processing unit 12. The storage unit 11 is, for example, a memory or a storage apparatus included in the influence range specifying apparatus 10. The processing unit 12 is, for example, a processor included in the influence range specifying apparatus 10.

The storage unit 11 stores system configuration information 11$a$, use resource information 11$b$-1, 11$b$-2, . . . corresponding to the devices, and message logs 11$c$-1, 11$c$-2, . . . corresponding to pieces of software to be managed. The system configuration information 11$a$ is information indicating a coupling relationship between the plurality of devices M1 to M4 included in the network N. The use resource information 11$b$-1, 11$b$-2, . . . is information indicating temporal variation in the use status of resources in the plurality of devices M1 to M4, respectively. The message logs 11$c$-1, 11$c$-2, . . . are information storing messages output by the plurality of devices M1 to M4 through execution of corresponding software. Although the message logs 11$c$-1, 11$c$-2, . . . correspond to the pieces of software in the example of FIG. 1, one message log may be held for the entire system as long as an identifier of the software causing the output of the message is set in each message.

The processing unit 12 executes the following process based on the information stored in the storage unit 11.

The processing unit 12 first determines that a communication path between two devices with correlation in the use status of resources is an information transmission path based on the system configuration information 11$a$ and the use resource information 11$b$-1, 11$b$-2, . . . . For example, the processing unit 12 calculates a correlation coefficient of time-series variation in the use status of resources of each of the two devices and determines that there is a correlation between the two devices regarding the use status of resources when the correlation coefficient is equal to or greater than a given value. Two devices may be exchanging information to cooperate with each other when there is a correlation between the two devices regarding the use status of resources. Therefore, the processing unit 12 determines that the communication path between the two correlated devices is an information transmission path used to transmit information.

The processing unit 12 then generates an influence propagation model 13 based on the message logs 11c-1, 11c-2, . . . . For example, the processing unit 12 calculates a co-occurrence probability of output of message between a first device and a second device for each of a plurality of pieces of software. The co-occurrence probability is a probability that a second device adjacent to a first device on the information transmission path outputs a message through execution of software within a certain time after the first device outputs a message through execution of software.

When the co-occurrence probability is equal to or greater than a threshold, the processing unit 12 sets a direction from the first device to the second device as an influence propagation direction of a failure of corresponding software in the information transmission path to generate an influence propagation model 13. For example, the processing unit 12 sets a propagation direction in the direction from the first device to the second device for a first adjacent coupling relationship that is a coupling relationship on the influence propagation model 13 between the first device and the second device in a relationship in which the co-occurrence probability is equal to or greater than the threshold (co-occurrence relationship). The processing unit 12 further traces the information transmission path in the direction opposite the first device from the second device and sets a propagation direction in the traced direction for a second adjacent coupling relationship that is a coupling relationship on the influence propagation model 13 between the devices on the traced path. In the example of FIG. 1, a device C is the first device, and a device B is the second device. In this case, the processing unit 12 sets the direction from the device C to the device B as the propagation direction of influence for the influence propagation model 13. The processing unit 12 further traces the information transmission path in the direction opposite the device C, which is the first device, from the device B, which is the second device, and detects an adjacent coupling relationship between the device A and the device B on the traced path. The processing unit 12 then supplements the direction from the device B to the device A as a propagation direction of influence along the traced direction of the information transmission path.

Subsequently, the processing unit 12 acquires failure information 14 indicating a failed device in which one of a plurality of pieces of software is failed. The processing unit 12 that has acquired the failure information 14 specifies devices, which may be reached by tracing the information transmission path from the failed device in the influence propagation direction indicated in the influence propagation mode of one piece of software, as influenced devices influenced by the failure in the failed device. The processing unit 12 then outputs influenced device information 15 indicating the influenced devices.

In this way, the influence propagation model 13 is created for each piece of software, and the influence propagation model 13 corresponding to the software with a failure is used to specify the devices influenced by the failure to accurately specify the influence range of the failure. The failure may be efficiently handled by accurately specifying the influence range of the failure.

Moreover, the correlation between the devices regarding the status of resource usage and the co-occurrence relationship between the output messages are combined to reduce the chance of specifying a device not influenced by the failure as a device influenced by the failure by mistake. For example, the propagation direction of the influence of failure is not taken into account in the method of using the correlation between the devices regarding the use status of resources. Therefore, although a downstream device in the propagation direction influenced by the failure is supposed to be specified as the influence range, an upstream device not influenced by the failure is also detected. Thus, the processing unit 12 uses the co-occurrence relationship between the logs to define the propagation direction of the influence and traces the devices in the propagation direction of the influence from the device with the failure to specify only the devices as devices influenced by the failure. In this way, a device coupled in the direction opposite the propagation direction of the influence from the device with the failure is not output as a device influenced by the failure even when the device is in the information transmission path. This improves the accuracy of specifying the influence range of the failure.

In generating the influence propagation model 13, the processing unit 12 may set a weight according to the number of information transmission paths passing through an adjacent coupling relationship, for each of a plurality of adjacent coupling relationships indicating coupling relationships between adjacent devices on the influence propagation model 13. In the case where the weight is set, the processing unit 12 outputs information indicating the weight of the adjacent coupling relationship when the processing unit 12 outputs the influenced device information 15. In this way, when a failure of software is to be handled, the devices may be handled in descending order of importance to efficiently handle the failure.

When the processing unit 12 acquires failure information of a failure related to two or more pieces of software, the processing unit 12 may specify the influenced devices based on the influence propagation model 13 of each of the two or more pieces of software. In this way, a failure involving a plurality of pieces of software cooperating with each other may be efficiently handled.

Second Embodiment

Next, a second embodiment will be described.

Figure 2:
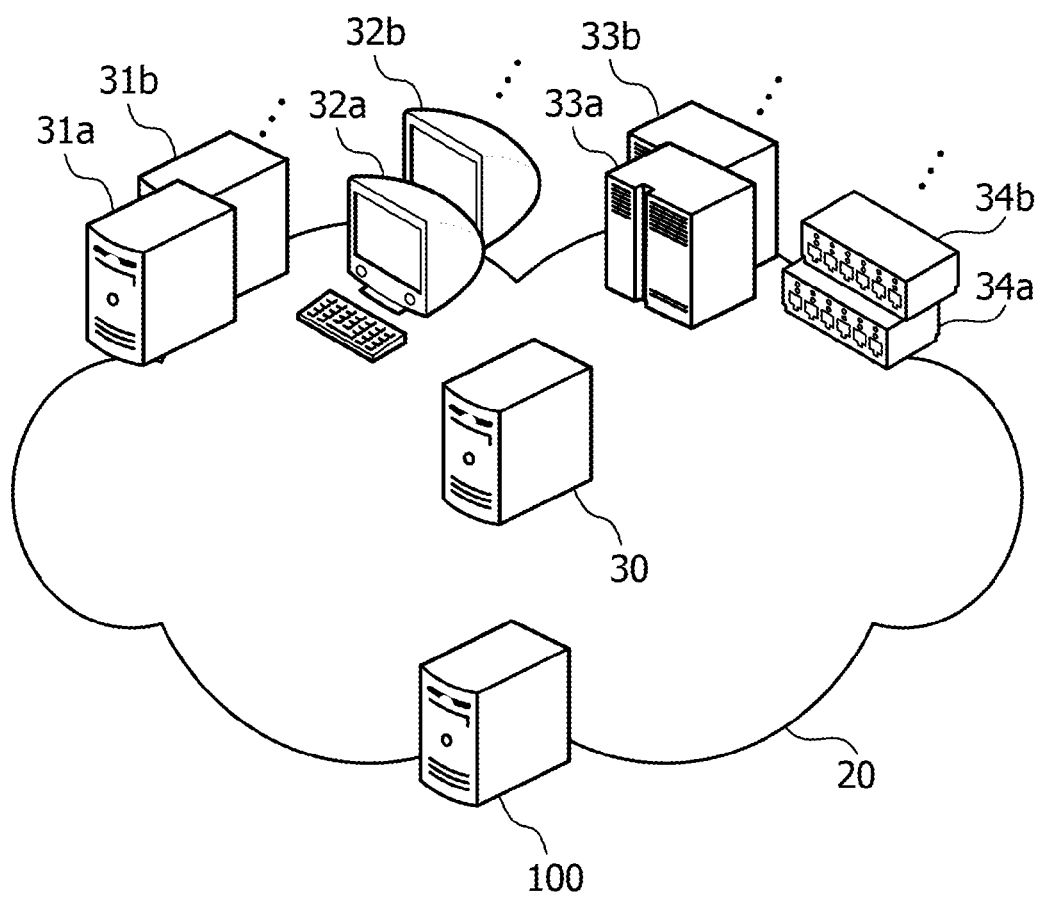
FIG. 2 depicts a system configuration example of a second embodiment.

FIG. 2 depicts a system configuration example of the second embodiment. A network 20 includes devices to be monitored, such as servers 31a, 31b, . . . , terminal apparatuses 32a, 32b, . . . , storage apparatuses 33a, 33b, . . . , and network devices 34a, 34b, . . . . A monitoring server 30 monitors these devices. The monitoring server 30 is a computer that monitors devices on the network 20. The monitoring server 30 periodically acquires information indicating the use status of the CPU and the memory from, for example, each device. The monitoring server 30 acquires, from each device, a log of messages output by software operated in each device. The monitoring server 30 further detects a fault of each device. For example, the monitoring server 30 periodically transmits a signal for confirming the existence to each device and determines that there is a fault in the device that does not respond to the signal for more than a given period.

The management server 100 acquires information from the monitoring server 30 and detects the influence range of a fault when there is a fault in any one of the devices.

Figure 3:
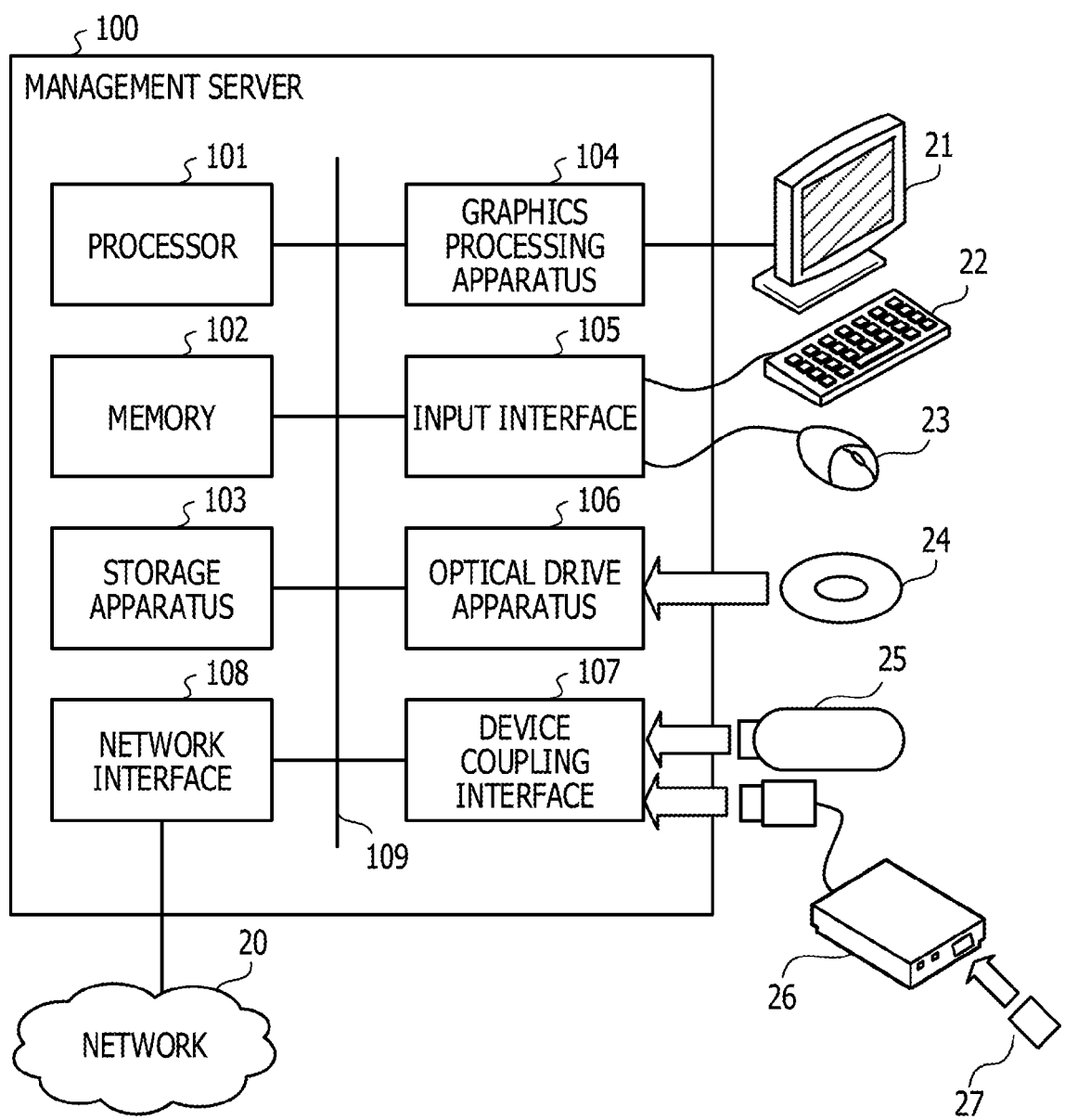
FIG. 3 depicts a configuration example of hardware of a management server used in the second embodiment.

FIG. 3 depicts a configuration example of hardware of a management server used in the second embodiment. In the management server 100, a processor 101 controls the entire apparatus. A memory 102 and a plurality of peripheral devices are coupled to the processor 101 through a bus 109. The processor 101 may be a multiprocessor. The processor 101 is, for example, a CPU, a micro processing unit (MPU), or a digital signal processor (DSP). An electronic circuit, such as an application specific integrated circuit (ASIC) and a programmable logic device (PLD), may realize at least part of the functions realized by programs executed by the processor 101.

The memory 102 is used as a main storage apparatus of the management server 100. At least part of programs of an operating system (OS) and application programs to be executed by the processor 101 is temporarily stored in the memory 102. Various types of data necessary for processes executed by the processor 101 are stored in the memory 102. An example of the memory 102 includes a volatile semiconductor storage apparatus such as a random access memory (RAM).

Examples of the peripheral devices coupled to the bus 109 include a storage apparatus 103, a graphics processing apparatus 104, an input interface 105, an optical drive apparatus 106, a device coupling interface 107, and a network interface 108.

The storage apparatus 103 electrically or magnetically writes data to and reads data from a built-in recording medium. The storage apparatus 103 is used as an auxiliary storage apparatus of the computer. The programs of the OS, the application programs, and various types of data are stored in the storage apparatus 103. Examples of the storage apparatus 103 that may be used include a hard disk drive (HDD) and a solid state drive (SSD).

A monitor 21 is coupled to the graphics processing apparatus 104. The graphics processing apparatus 104 displays an image on a screen of the monitor 21 according to a command from the processor 101. Examples of the monitor 21 include a display apparatus using cathode ray tube (CRT) and a liquid crystal display apparatus.

A keyboard 22 and a mouse 23 are coupled to the input interface 105. The input interface 105 transmits a signal sent from the keyboard 22 or the mouse 23 to the processor 101. The mouse 23 is an example of a pointing device, and other pointing devices may also be used. Examples of the other pointing devices include a touch panel, a tablet, a touchpad, and a trackball.

The optical drive apparatus 106 uses laser light or the like to read data recorded in an optical disk 24. The optical disk 24 is a portable recording medium recording data that may be read by reflection of light. Examples of the optical disk 24 include a digital versatile disc (DVD), a DVD-RAM, a compact disc read only memory (CD-ROM), a CD-recordable (R)/rewritable (RW).

The device coupling interface 107 is a communication interface for coupling a peripheral device to the management server 100. For example, a memory apparatus 25 or a memory reader/writer 26 may be coupled to the device coupling interface 107. The memory apparatus 25 is a recording medium with a function of communicating with the device coupling interface 107. The memory reader/writer 26 is an apparatus that writes data to a memory card 27 or reads data from the memory card 27. The memory card 27 is a card-type recording medium.

The network interface 108 is coupled to the network 20. The network interface 108 transmits and receives data to and from another computer or a communication device through the network 20.

The hardware configuration may realize processing functions of the second embodiment. The apparatus illustrated in the first embodiment may also be realized by hardware similar to the management server 100 illustrated in FIG. 3.

The management server 100 executes, for example, a program recorded in a computer-readable recording medium to realize the processing functions of the second embodiment. The program describing the details of processes to be executed by the management server 100 may be recorded in various recording media. For example, the program to be executed by the management server 100 may be stored in the storage apparatus 103. The processor 101 loads at least part of the program in the storage apparatus 103 to the memory 102 to execute the program. Alternatively, the program to be executed by the management server 100 may be recorded in a portable recording medium, such as the optical disk 24, the memory apparatus 25, and the memory card 27. The program stored in the portable recording medium may be installed on the storage apparatus 103 and executed based on, for example, the control from the processor 101. Alternatively, the processor 101 may directly read the program from the portable recording medium to execute the program.

Next, failure influence range detecting functions included in the management server 100 will be described.

Figure 4:
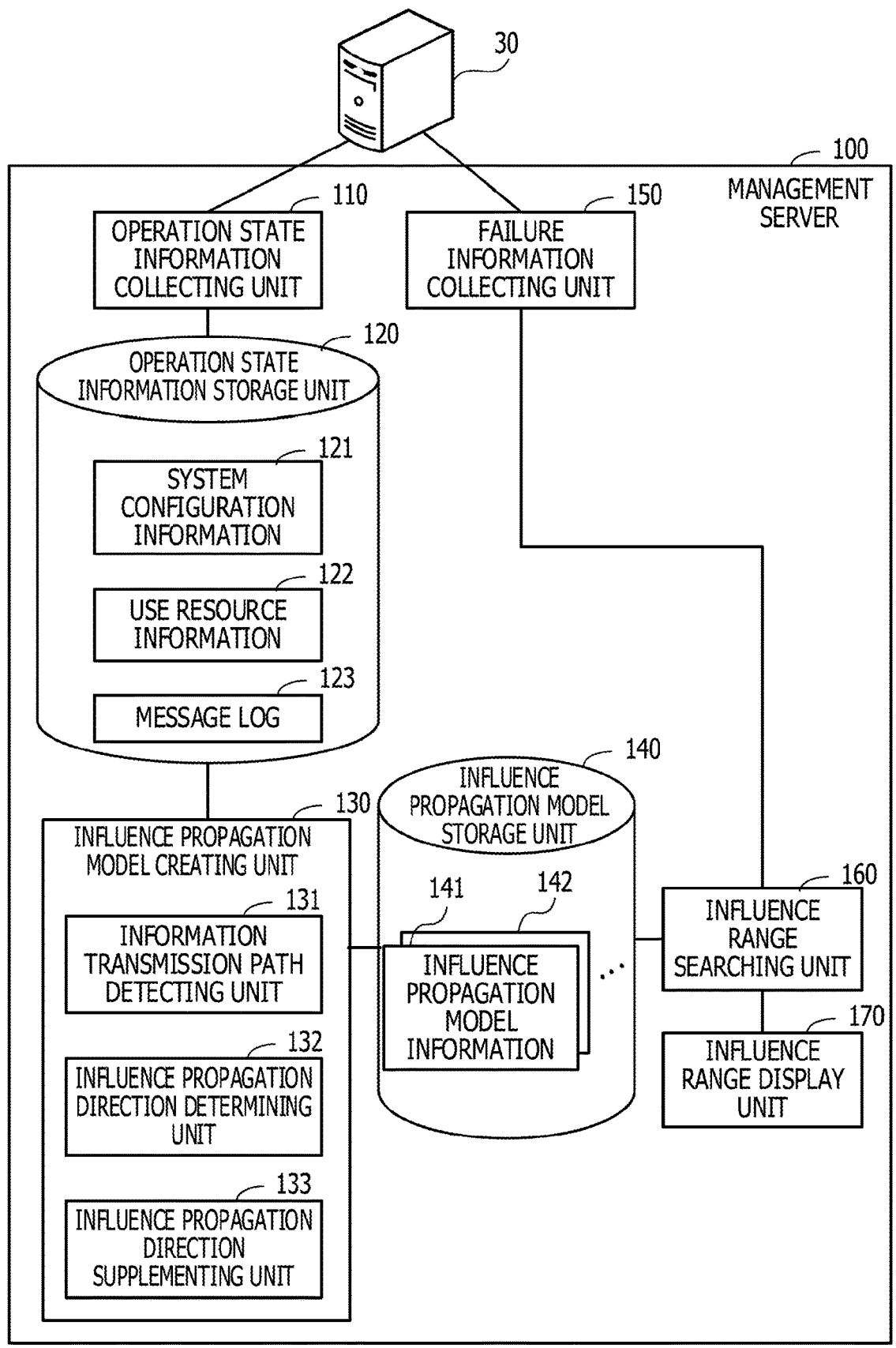
FIG. 4 is a block diagram illustrating failure influence range detecting functions of a management server.

FIG. 4 is a block diagram illustrating failure influence range detecting functions of a management server. The management server 100 includes an operation state information collecting unit 110, an operation state information storage unit 120, an influence propagation model creating unit 130, an influence propagation model storage unit 140, a failure information collecting unit 150, an influence range searching unit 160, and an influence range display unit 170.

The operation state information collecting unit 110 collects information regarding the operation state of the devices in the system through the monitoring server 30. For example, the operation state information collecting unit 110 collects configuration information of the system, use resource information indicating the use status of resources of each device, a message log, and the like. The operation state information collecting unit 110 collects the information at, for example, the beginning of the system operation as well as at a large-scale change in the system or at a periodical timing such as once a month.

The operation state information storage unit 120 stores the information collected by the operation state information collecting unit 110. For example, the operation state information storage unit 120 stores system configuration information 121, use resource information 122, a message log 123, and the like.

The influence propagation model creating unit 130 creates an influence propagation model of each piece of software based on the information stored in the operation state information storage unit 120. The influence propagation model creating unit 130 includes an information transmission path detecting unit 131, an influence propagation direction determining unit 132, and an influence propagation direction supplementing unit 133.

The information transmission path detecting unit 131 performs correlation analysis between apparatuses regarding the use status of resources and detects a communication path between correlated apparatuses as an information transmission path.

The influence propagation direction determining unit 132 analyzes the co-occurrence relationship between adjacent apparatuses regarding messages and determines the propagation direction of influence. For example, when an apparatus outputs a message at a high probability within a given time after another apparatus outputs a message, the influence propagation direction determining unit 132 determines that the influence is propagated from the apparatus outputting the message first to the apparatus outputting the message second.

The influence propagation direction supplementing unit 133 supplements the propagation path of the influence not detected by the influence propagation direction determining unit 132. For example, the influence propagation direction supplementing unit 133 traces the information transmission path extracted by the information transmission path detecting unit 131 toward the downstream in the influence propagation direction determined by the influence propagation direction determining unit 132 and supplements the influence propagation direction toward the downstream devices up to the end of the information transmission path.

The influence propagation model storage unit 140 stores influence propagation model information 141, 142, . . . corresponding to the pieces of software indicating the influence propagation models created by the influence propagation model creating unit 130.

The failure information collecting unit 150 collects failure information indicating a failure in any one of the devices from the monitoring server 30.

When the failure information collecting unit 150 collects the failure information, the influence range searching unit 160 searches for the influence range of the failure based on the influence propagation model information 141, 142, . . . .

The influence range display unit 170 displays the searched influence range. The influence range display unit 170 may also notify a designated administrator or user of the occurrence of failure and the influence range.

The lines coupling the elements illustrated in FIG. 4 indicate part of the communication paths, and communication paths other than the illustrated communication paths may also be set. The function of each element illustrated in FIG. 4 may be realized by, for example, causing the computer to execute a program module corresponding to the element. The operation state information storage unit 120 and the influence propagation model storage unit 140 are realized by using part of the storage area of the memory 102 or the storage apparatus 103 of the management server 100.

Next, the information stored in the operation state information storage unit 120 will be described in detail.

Figure 5:
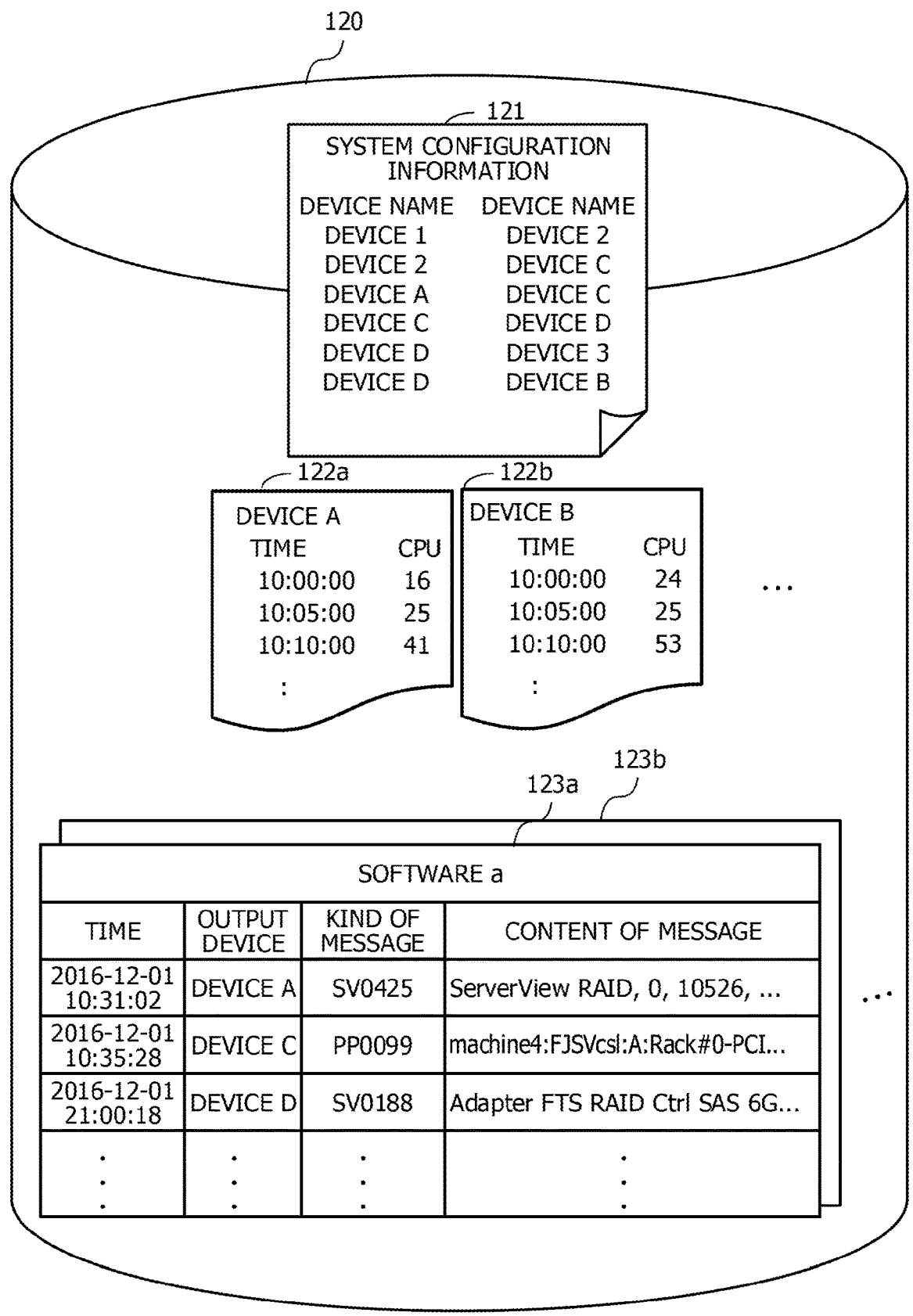
FIG. 5 depicts an example of information stored in an operation state information storage unit.

FIG. 5 depicts an example of information stored in an operation state information storage unit. The system configuration information 121 indicating the coupling relationship between the devices to be managed is stored in the operation state information storage unit 120. A plurality of pairs of two directly coupled devices are registered in the system configuration information 121.

Use resource information 122*a*, 122*b*, . . . corresponding to the devices is stored in the operation state information storage unit 120. The use resource information 122*a*, 122*b*, . . . includes results of periodical measurement of the use status of resources, such as a CPU and a memory, of corresponding devices. In the case of the use status related to the CPU, the CPU usage at every certain time is indicated in the use resource information 122*a*, 122*b*, . . . in chronological order. In the case of the use status related to the memory, the used memory capacity at every certain time is indicated in the use resource information 122*a*, 122*b*, . . . .

Message logs 123*a*, 123*b*, . . . corresponding to the kinds of software are further stored in the operation state information storage unit 120. For example, messages output by a plurality of devices through execution of software named "software a" are included in the message log 123*a*. Each message includes information, such as time of output, output device, kind of message, and content of message.

Next, the information stored in the influence propagation model storage unit 140 will be described in detail.

FIG. 6 depicts an example of information stored in an influence propagation model storage unit. The influence propagation model information 141, 142, . . . corresponding to the pieces of software is stored in the influence propagation model storage unit 140. For example, the influence propagation model information 141 is information indicating the influence propagation model regarding the software named "software a." For example, records of each coupling relationship between two devices are registered in the influence propagation model information 141. Each record is provided with fields of identifier (ID), device at first end, device at second end, transmission, "to the right," "to the left," and weight.

An identifier of the coupling relationship (coupling relationship ID) is set in the field of ID. The name of the device at one end in the coupling relationship is set in the field of device at first end. The name of the device at second end that is the other end in the coupling relationship is set in the field of device at second end. The number of device pairs using the corresponding coupling relationship as the information transmission path is set in the field of transmission. A flag indicating whether or not the influence propagates from the device at first end to the device at second end is set in the field of "to the right." When the influence propagates from the device at first end to the device at second end, "1" is set in the field of "to the right." When the influence does not propagate from the device at first end to the device at second end, "0" is set in the field. A flag indicating whether or not the influence propagates from the device at second end to the device at first end is set in the field of "to the left." When the influence propagates from the device at second end to the device at first end, "1" is set in the field of "to the left." When the influence does not propagate from the device at second end to the device at first end, "0" is set in the field. A value (weight) indicating the magnitude of the influence of failure is set in the field of weight.

An influence propagation model 41 is defined by the influence propagation model information 141. In the influence propagation model 41, each device is expressed by a node, and the nodes in the coupling relationship are coupled by a line, for example. In the influence propagation model 41, the weight of the corresponding coupling relationship is expressed by the thickness of the line, for example. In the influence propagation model 41, the propagation direction of the influence is expressed by an arrow at one end of the coupling line.

The system configured in this way creates the influence propagation model, and upon failure, the influence propagation model is used to display the range of the influence of the failure.

Next, a procedure of creating the influence propagation model based on the collected operation state information will be described in detail.

Figure 7:
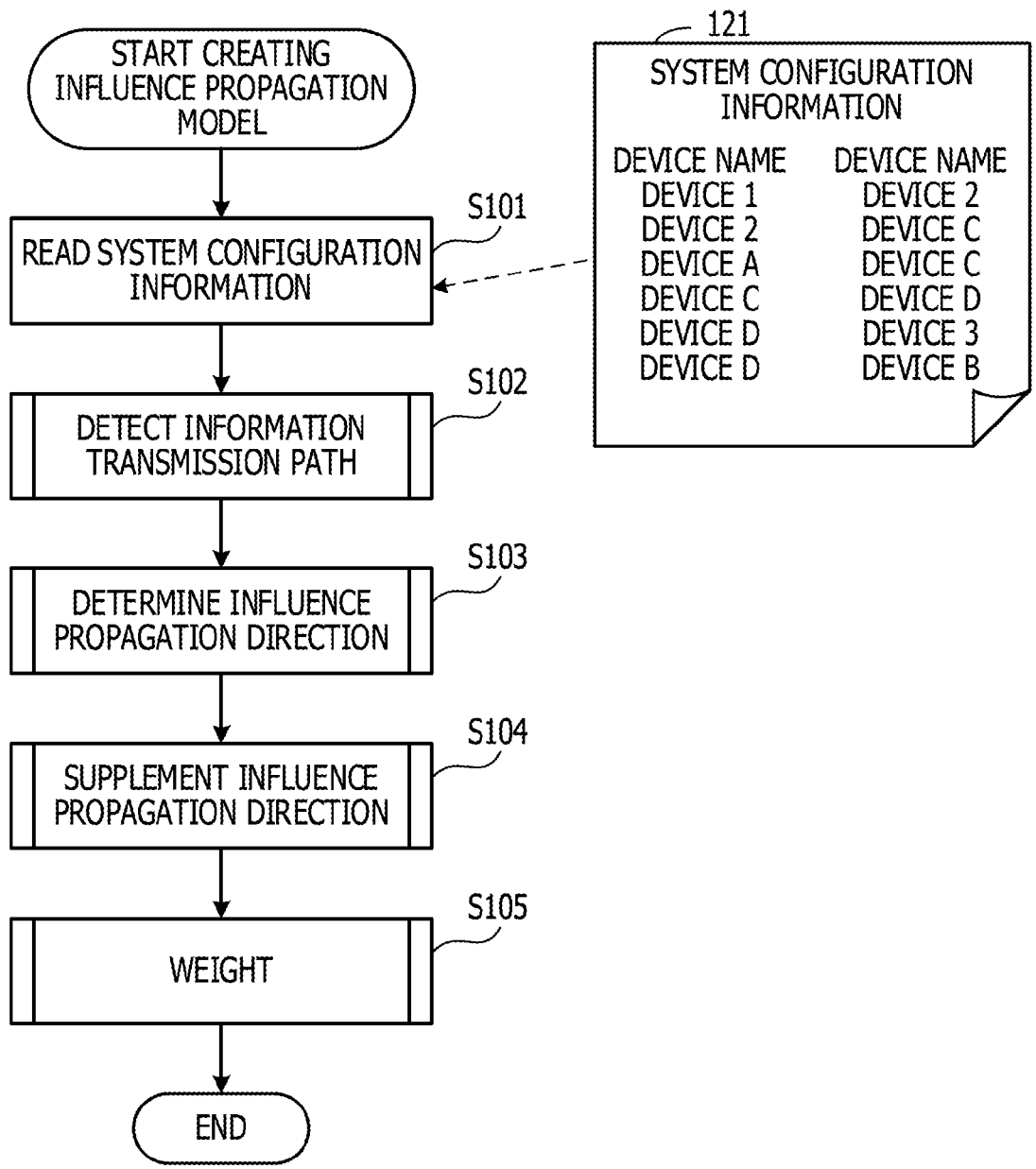
FIG. 7 is a flow chart illustrating an example of a procedure of an influence propagation model creating process.

FIG. 7 is a flow chart illustrating an example of a procedure of an influence propagation model creating process. The influence propagation model creating process is started in response to, for example, an influence propagation model creation instruction input by the user. Alternatively, the influence propagation model creating process may be started at a preset time. Furthermore, the influence propagation model creating process may be periodically executed at certain time intervals. The process illustrated FIG. 7 will be described along with step numbers.

[S101] The information transmission path detecting unit 131 in the influence propagation model creating unit 130 reads the system configuration information 121 from the operation state information storage unit 120.

[S102] The information transmission path detecting unit 131 executes an information transmission path detecting process. Details of the information transmission path detecting process will be described later (see FIG. 10). As a result of the information transmission path detecting process, values are set in the fields of transmission in each piece of the influence propagation model information 141, 142, . . . .

[S103] The influence propagation direction determining unit 132 in the influence propagation model creating unit 130 executes an influence propagation direction determining process. Details of the influence propagation direction determining process will be described later (see FIG. 14).

[S104] The influence propagation direction supplementing unit 133 in the influence propagation model creating unit 130 uses the determination result of the influence propagation direction determining process to estimate the influence propagation direction of an undetermined path to supplement the influence propagation direction. Details of the influence propagation direction supplementing process will be described later (see FIGS. 18A and 18B).

[S105] The influence propagation direction supplementing unit 133 executes a weighting process of the coupling relationship. Details of the weighting process will be described later (see FIG. 20).

The influence propagation model information 141, 142, . . . corresponding to the pieces of software as illustrated in FIG. 6 may be created in the procedure. Each process of S102 to S105 illustrated in FIG. 7 will be described in detail.

The information transmission path detecting process will be described with reference to FIGS. 8 to 12.

Figure 8:
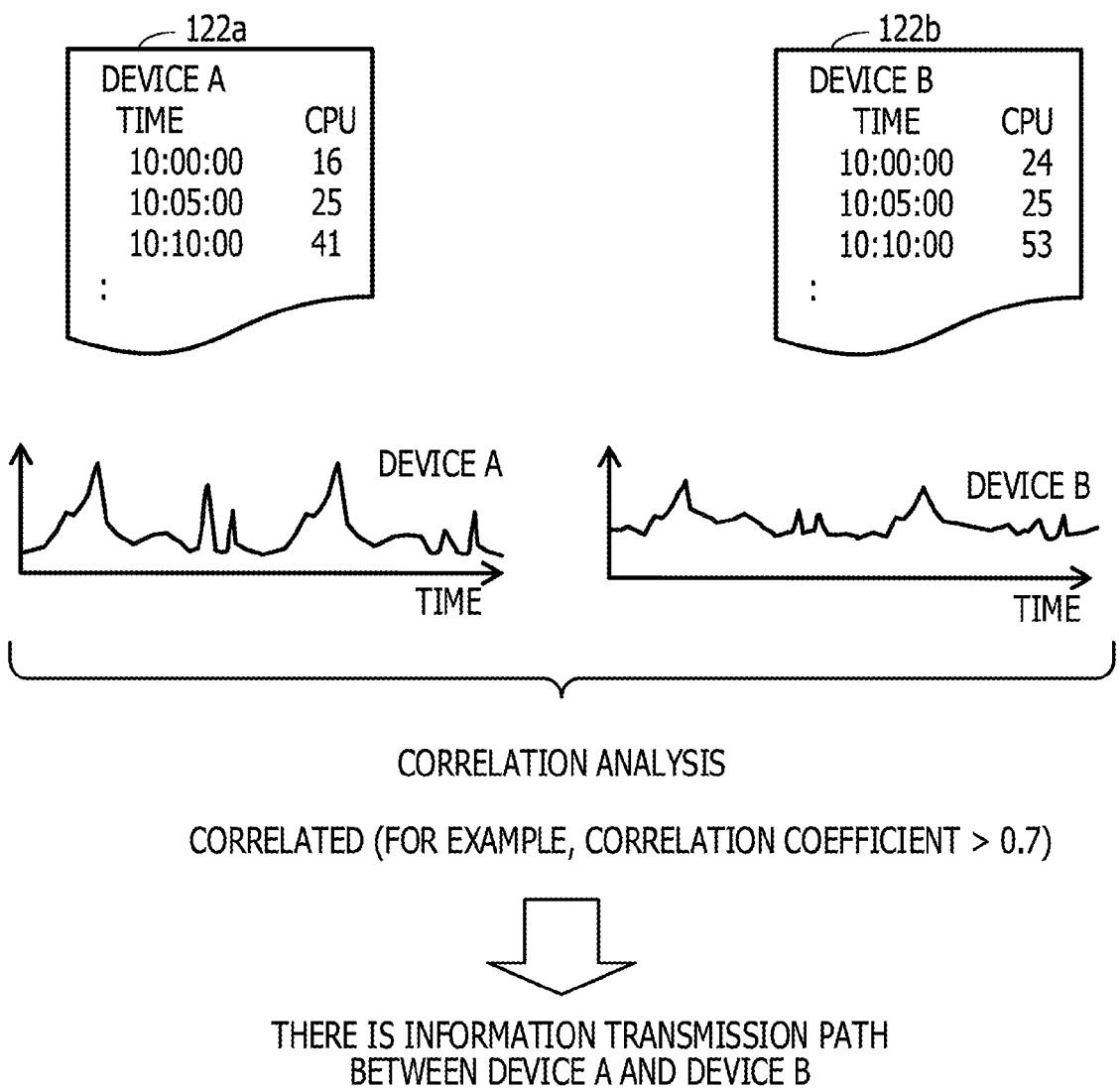
FIG. 8 depicts a detection method of an information transmission path.

FIG. 8 depicts a detection method of an information transmission path. In the second embodiment, correlation analysis of use resources between devices is used to detect the information transmission path. The correlation analysis is quantification of a correlation between two variables. A numerical value indicating the correlation is called a correlation coefficient. The correlation coefficient is, for example, a Pearson's correlation coefficient. The larger the value of the correlation coefficient, the higher the correlation between two variables.

The information transmission path detecting unit 131 performs the correlation analysis of all combinations of two devices among the devices to be managed. For example, when the information transmission path detecting unit 131 performs the correlation analysis of the device A and the device B, the information transmission path detecting unit 131 calculates the correlation coefficient between the use resource information 122a of the device A and the use resource information 122b of the device B. If the correlation coefficient is greater than a given threshold (for example, "0.7"), there is a correlation between the device A and the device B regarding the status of resource usage. Although the threshold for determining whether or not there is a correlation is "0.7" in the example of FIG. 8, the value is an example, and another threshold, such as "0.5," may also be used as a threshold.

Information regarding cooperative processing may be transmitted between the devices with correlation in the use status of resources. Therefore, the information transmission path detecting unit 131 detects the communication path between the correlated devices as an information transmission path. The information transmission path is not simply a path that allows communication, but is a path in which information influencing the partner apparatus is transmitted in the actual operation. For example, even if there is a path between two apparatuses on the configuration diagram of the coupling relationship, the path may not be the information transmission path. The path may be a path that is physically coupled, but not actually used much. The path may be a path coupled in the design, but not currently coupled.

As illustrated in FIG. 8, when the paths between the devices with correlation in the use status of resources are detected as information transmission paths, part of the detected paths may overlap.

FIG. 9 depicts an example in which information transmission paths overlap. In the detected overlapping paths, it is more likely that information influencing the devices with each other is transmitted. Therefore, the information transmission path detecting unit 131 determines that the devices with more overlapping correlated paths are strongly related and weights the paths. For each coupling path between adjacent devices, the number of information transmission paths passing through the path is set as a numerical value of the weight, and the numerical value is used as a value of transmission of the coupling path.

In the example of FIG. 9, the devices are coupled in the order of a device A, a device C, a device D, and a device B. The device A and the device B are correlated, and the device A and the device D are also correlated. In this case, the number of information transmission paths passing through the coupling path between the device A and the device C is two. Therefore, "2" is set as a value of transmission for the coupling path between the device A and the device C. Similarly, the number of information transmission paths passing through the coupling path between the device C and the device D is two. Therefore, "2" is set as a value of transmission for the coupling path between the device C and the device D. The number of overlapping information transmission paths in the section between the device D and the device B is one. Therefore, "1" is set as a value of transmission for the coupling path between the device D and the device B.

In this way, the correlation analysis of the use status of resources between devices is performed to detect the information transmission paths, and the value corresponding to the number of information transmission paths passing through the coupling relationship between adjacent apparatuses is set as the value of transmission of the coupling relationship.

The procedure of the information transmission path detecting process will be described in detail.

Figure 10:
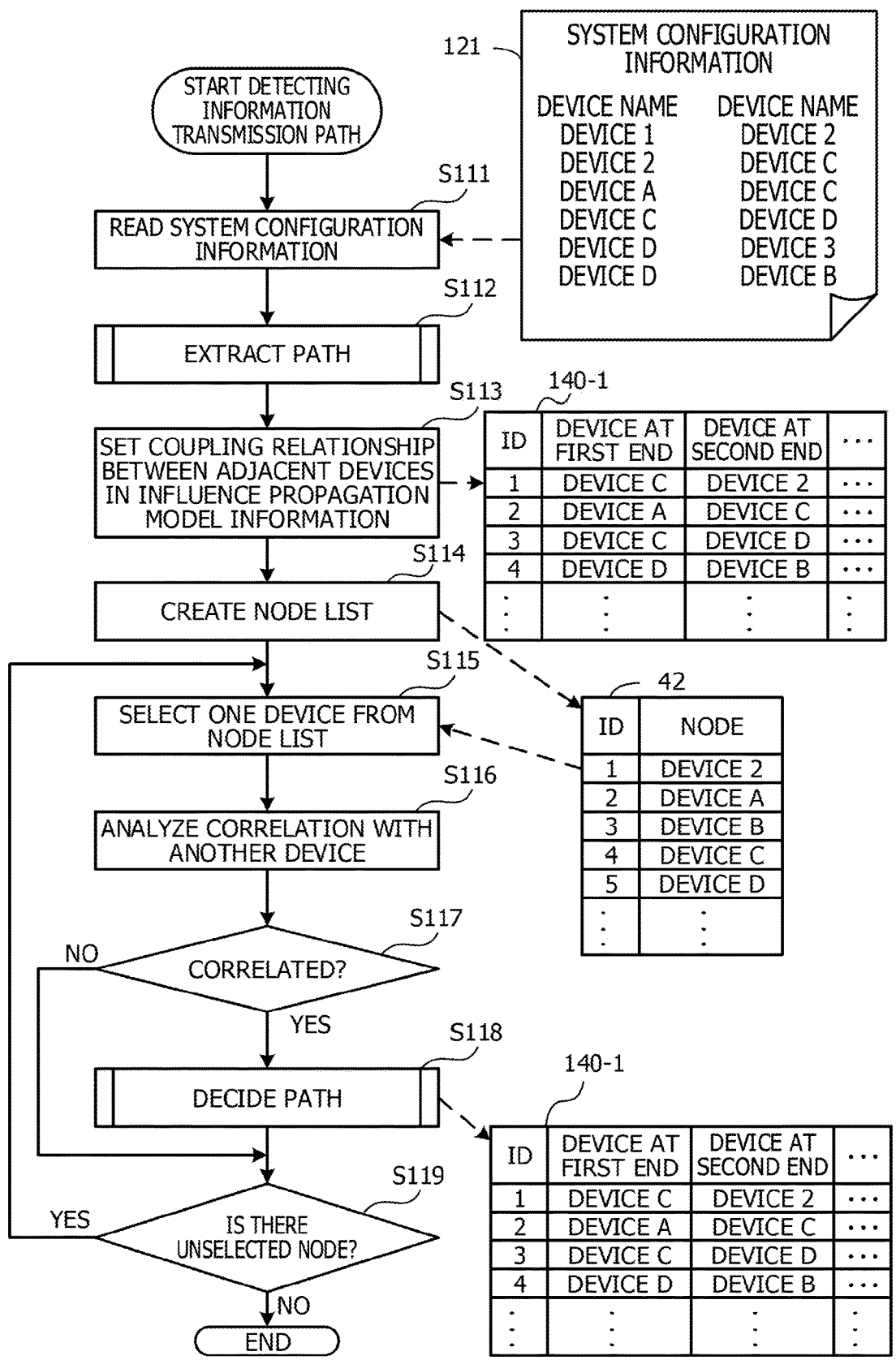
FIG. 10 is a flow chart illustrating an example of a procedure of an information transmission path detecting process.

FIG. 10 is a flow chart illustrating an example of a procedure of an information transmission path detecting process. The process illustrated in FIG. 10 will be described along with step numbers.

[S111] The information transmission path detecting unit 131 reads the system configuration information 121 from the operation state information storage unit 120.

[S112] The information transmission path detecting unit 131 extracts a path of communication from an end device to another end device in the coupling relationship based on the system configuration information 121. Details of the path extracting process will be described later (see FIG. 11). As a result of the path extracting process, a path list indicating the extracted paths is created.

[S113] The information transmission path detecting unit 131 extracts the coupling relationship between adjacent devices and sets the coupling relationship in common influence propagation model information 140-1. For example, the information transmission path detecting unit 131 creates the common influence propagation model information 140-1 in an initial state. The information transmission path detecting unit 131 then provides an ID to each device pair in the coupling relationship based on the system configuration information 121 and adds the record corresponding to each device pair to the common influence propagation model information 140-1. For the device at first end and the device at second end of the record to be added, the information transmission path detecting unit 131 sets the names of the devices included in the device pair corresponding to the record. In this case, the information transmission path detecting unit 131 regards the device on the left as the device at first end and regards the device on the right as the device at second end in the path indicated in the device list created in S112. At this point, the values in the fields of "to the right," "to the left," and weight are "0" in each record registered in the common influence propagation model information 140-1. The information transmission path detecting unit 131 stores the created common influence propagation model information 140-1 in the memory 102.

[S114] The information transmission path detecting unit 131 creates a node list 42 listing the devices included in the system. The names of the devices are registered in the node list 42 without duplication.

[S115] The information transmission path detecting unit 131 selects one unselected device from the node list 42.

[S116] The information transmission path detecting unit 131 uses use resource information 112 of the selected device and another device to perform the correlation analysis.

[S117] The information transmission path detecting unit 131 determines whether there is another correlated device. If there is another correlated device, the information transmission path detecting unit 131 advances the process to S118. If there is no correlated device, the information transmission path detecting unit 131 advances the process to S119.

[S118] For each of the other correlated devices, the information transmission path detecting unit 131 executes a path deciding process of searching for the information transmission path between the selected device and the other device. Details of the path deciding process will be described later (see FIG. 12). As a result of the path deciding process, a value corresponding to the number of information transmission paths passing through the corresponding coupling relationship is set in the field of transmission in each record of the common influence propagation model information 140-1.

[S119] The information transmission path detecting unit 131 determines whether or not there is an unselected node in the node list 42. If there is an unselected node, the information transmission path detecting unit 131 advances the process to S115. If there is no unselected node, the information transmission path detecting unit 131 ends the information transmission path detecting process.

Next, details of the path extracting process will be described.

Figure 11:
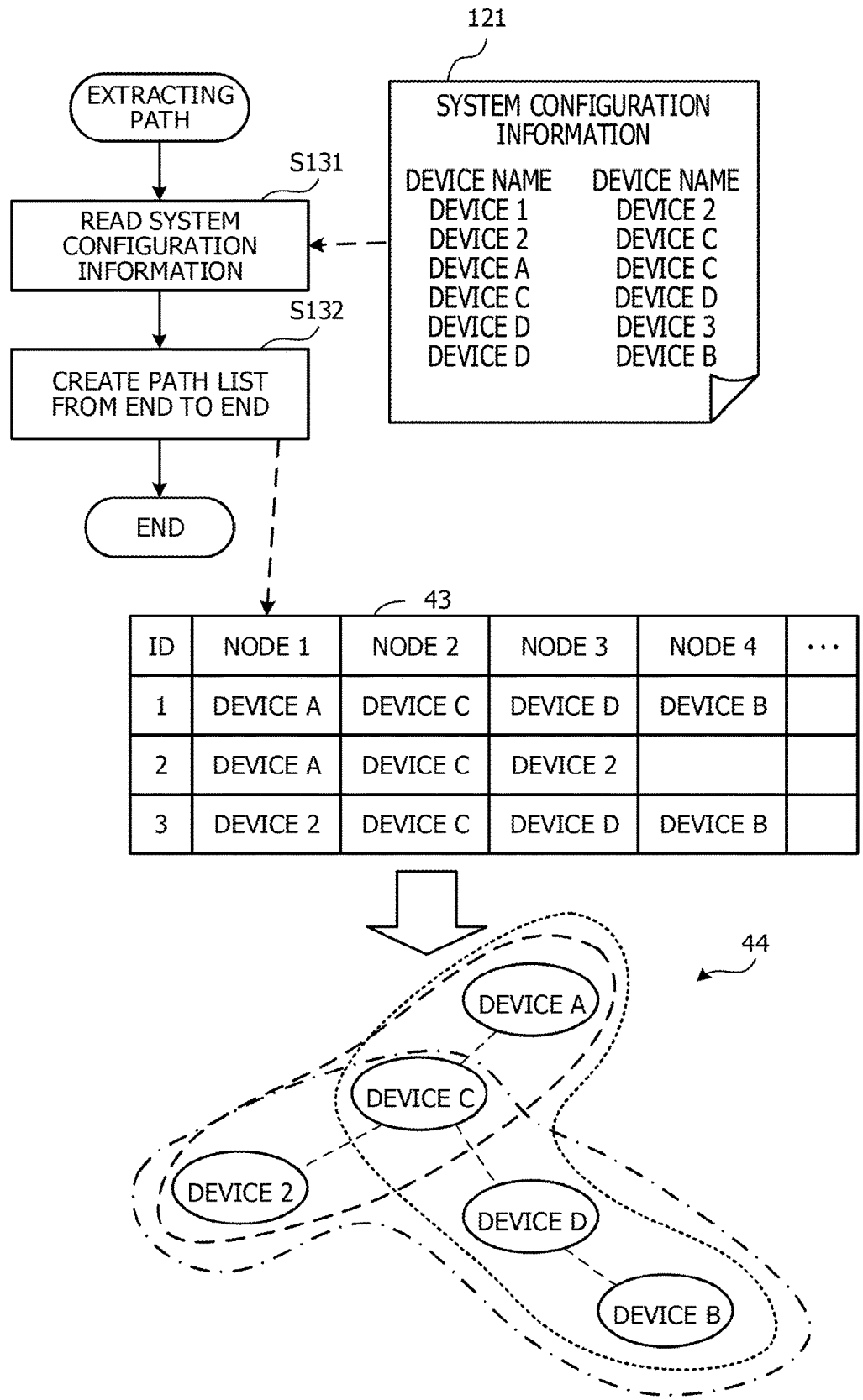
FIG. 11 is a flow chart illustrating an example of a procedure of a path extracting process.

FIG. 11 is a flow chart illustrating an example of a procedure of a path extracting process. The process illustrated in FIG. 11 will be described along with step numbers.

[S131] The information transmission path detecting unit 131 reads the system configuration information 121.

[S132] The information transmission path detecting unit 131 figures out the coupling relationship between the devices based on the system configuration information 121 and creates a path list 43 indicating a communication path from an end device to another end device. The end device is a device in which the number of directly coupled adjacent devices is only one.

For example, when a plurality of devices are coupled in a coupling relationship as illustrated in a path model 44, a device A, a device B, and a device 2 are end devices. In this case, path information indicating the path from the device A to the device B, the path from the device A to the device 2, and the path from the device 2 to the device B are registered in the path list 43. A path ID is provided to the path information registered in the path list 43. The names of the devices on the path from the device at one end of the path to the device at another end are set in the path information.

The information transmission path detecting unit 131 stores the created path list 43 in the memory 102 and ends the path extracting process.

Next, the path deciding process will be described in detail.

Figure 12:
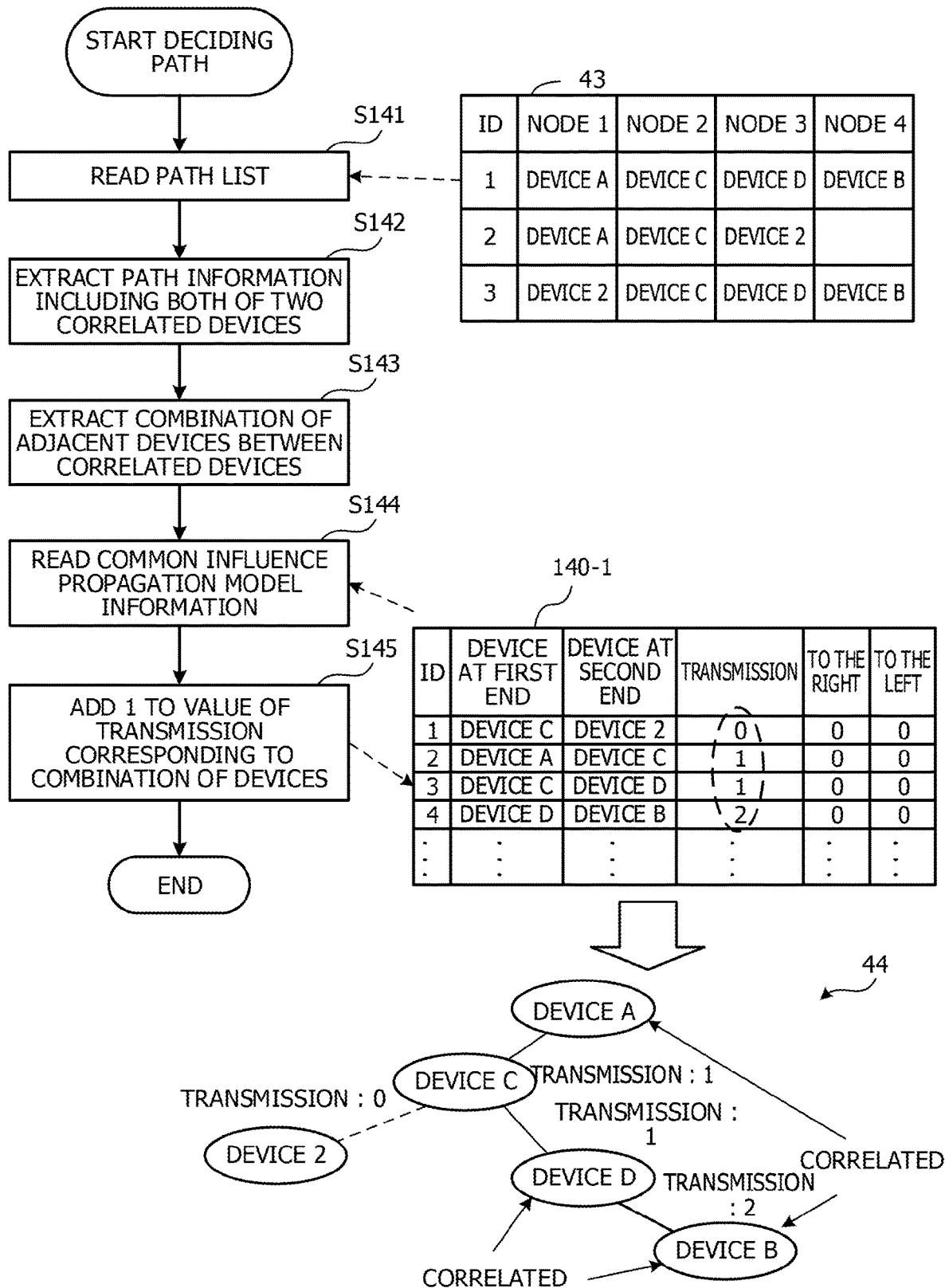
FIG. 12 is a flow chart illustrating an example of a procedure of a path deciding process.

FIG. 12 is a flow chart illustrating an example of a procedure of a path deciding process. The process illustrated in FIG. 12 will be described along with step numbers.

[S141] The information transmission path detecting unit 131 reads the path list 43 from the memory.

[S142] The information transmission path detecting unit 131 extracts, from the path list 43, the path information including both of two devices determined to be correlated in the correlation analysis of S116.

[S143] The information transmission path detecting unit 131 extracts a combination of adjacent devices from the two correlated devices and the devices between these devices based on the extracted path information.

[S144] The information transmission path detecting unit 131 reads the common influence propagation model information from the memory 102.

[S145] The influence propagation model storage unit 140 adds 1 to the value of transmission in the record corresponding to the extracted combination of devices in the common influence propagation model information 140-1.

For example, in the coupling relationship illustrated in the path model 44, it is assumed that the device A and the device B are correlated, and the device B and the device D are also correlated. In this case, the value of transmission in the record corresponding to the set of the device A and the device C is "1." The value of transmission in the record corresponding to the set of the device C and the device D is also "1." The value of transmission in the record corresponding to the set of the device D and the device B is "2." The coupling relationship between the device 2 and the device A is not used as an information transmission path, and the value of transmission in the record corresponding to the set of the device 2 and the device A is "0."

In this way, the information propagation path is detected, and the results are set in the common influence propagation model information 140-1.

Next, the influence propagation direction determining process will be described with reference to FIGS. 13 to 15.

FIG. 13 depicts an example of determining an influence propagation direction. FIG. 13 illustrates an example of determining the co-occurrence relationship regarding the software named "software a." The co-occurrence relationship between messages is used to determine the influence propagation direction.

For example, the time that each device has output a message is found out based on the message log 123$a$ of the software to be determined. Therefore, the influence propagation direction determining unit 132 calculates the probability of output of a message by a device within a given period after the output of a message by another device and sets the probability as a co-occurrence probability.

For example, the influence propagation direction determining unit 132 regards the device that outputs the message first as a first message output device and regards the device that outputs the message second as a second message output device. The influence propagation direction determining unit 132 creates a co-occurrence probability table 50 in which the records of the pairs of devices are registered. Subsequently, the influence propagation direction determining unit 132 calculates the co-occurrence probability for each pair of devices and sets the co-occurrence probability in the co-occurrence probability table 50. The influence propagation direction determining unit 132 then extracts a pair of devices with the co-occurrence probability greater than a threshold (for example, "0.7") as a pair of devices in the co-occurrence relationship.

When a pair of devices in the co-occurrence relationship is detected, it may be predicted that the influence of a failure or the like propagates from the first message output device to the second message output device in the pair of devices. Therefore, the influence propagation direction determining unit 132 determines that the direction from the first message output device to the second message output device in the co-occurrence relationship is the influence propagation direction.

Figure 14:
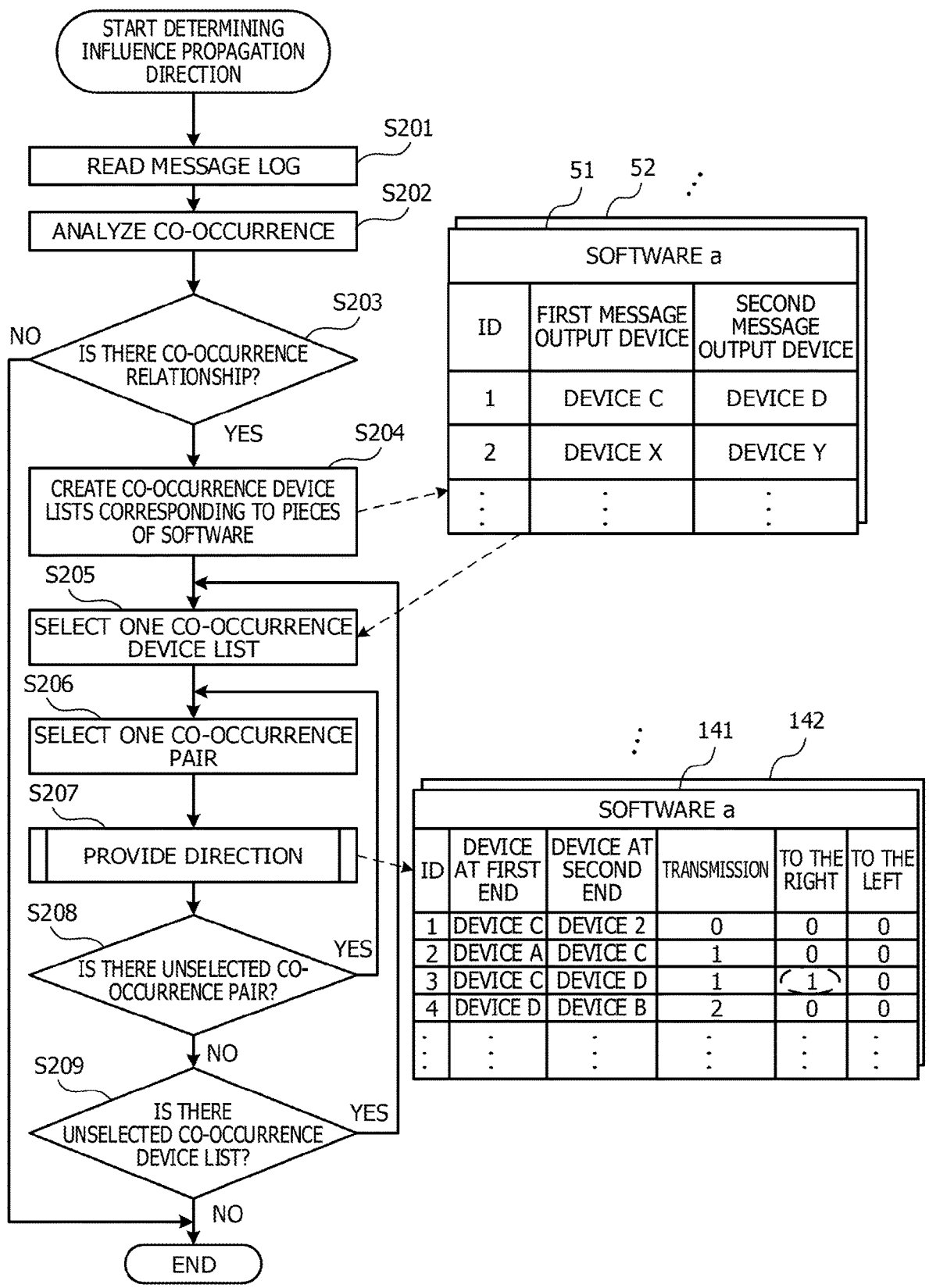
FIG. 14 is a flow chart illustrating an example of a procedure of an influence propagation direction determining process.

FIG. 14 is a flow chart illustrating an example of a procedure of an influence propagation direction determining process. The process illustrated in FIG. 14 will be described along with step numbers.

[S201] The influence propagation direction determining unit 132 reads the message log of each piece of software from the operation state information storage unit 120.

[S202] The influence propagation direction determining unit 132 performs co-occurrence analysis of messages for each combination of devices based on the message log of each piece of software.

[S203] The influence propagation direction determining unit 132 determines whether or not there is a co-occurrence relationship between devices in at least one combination. If there is a co-occurrence relationship, the influence propagation direction determining unit 132 advances the process to S204. If there is no co-occurrence relationship, the influence propagation direction determining unit 132 ends the influence propagation direction determining process.

[S204] The influence propagation direction determining unit 132 creates co-occurrence device lists 51, 52, . . . corresponding to the pieces of software. The pairs of devices in the co-occurrence relationship are set in the co-occurrence device lists 51, 52, . . . . In this case, the influence propagation direction determining unit 132 creates the influence propagation model information 141, 142, . . . corresponding to the pieces of software based on the common influence propagation model information 140-1. For example, the influence propagation direction determining unit 132 sets a plurality of copies of the common influence propagation model information 140-1 as the influence propagation model information 142, 142, . . . corresponding to the pieces of software.

[S205] The influence propagation direction determining unit 132 selects one unselected co-occurrence device list.

[S206] The influence propagation direction determining unit 132 selects one pair of devices in the co-occurrence relationship (co-occurrence pair) from the selected co-occurrence device list.

[S207] The influence propagation direction determining unit 132 executes a direction providing process regarding the selected co-occurrence pair with respect to the influence propagation model information of the same software as in the selected co-occurrence device list. Details of the direction providing process will be described later (see FIG. 15).

[S208] The influence propagation direction determining unit 132 determines whether or not there is an unselected co-occurrence pair among the co-occurrence pairs registered in the selected co-occurrence list. If there is an unselected co-occurrence pair, the influence propagation direction determining unit 132 advances the process to S206. If there is no unselected co-occurrence pair, the influence propagation direction determining unit 132 advances the process to S209.

[S209] The influence propagation direction determining unit 132 determines whether or not there is an unselected co-occurrence device list. If there is an unselected co-occurrence device list, the influence propagation direction determining unit 132 advances the process to S205. If there is no unselected co-occurrence device list, the influence propagation direction determining unit 132 ends the influence propagation direction determining process.

Next, the direction providing process will be described in detail.

Figure 15:
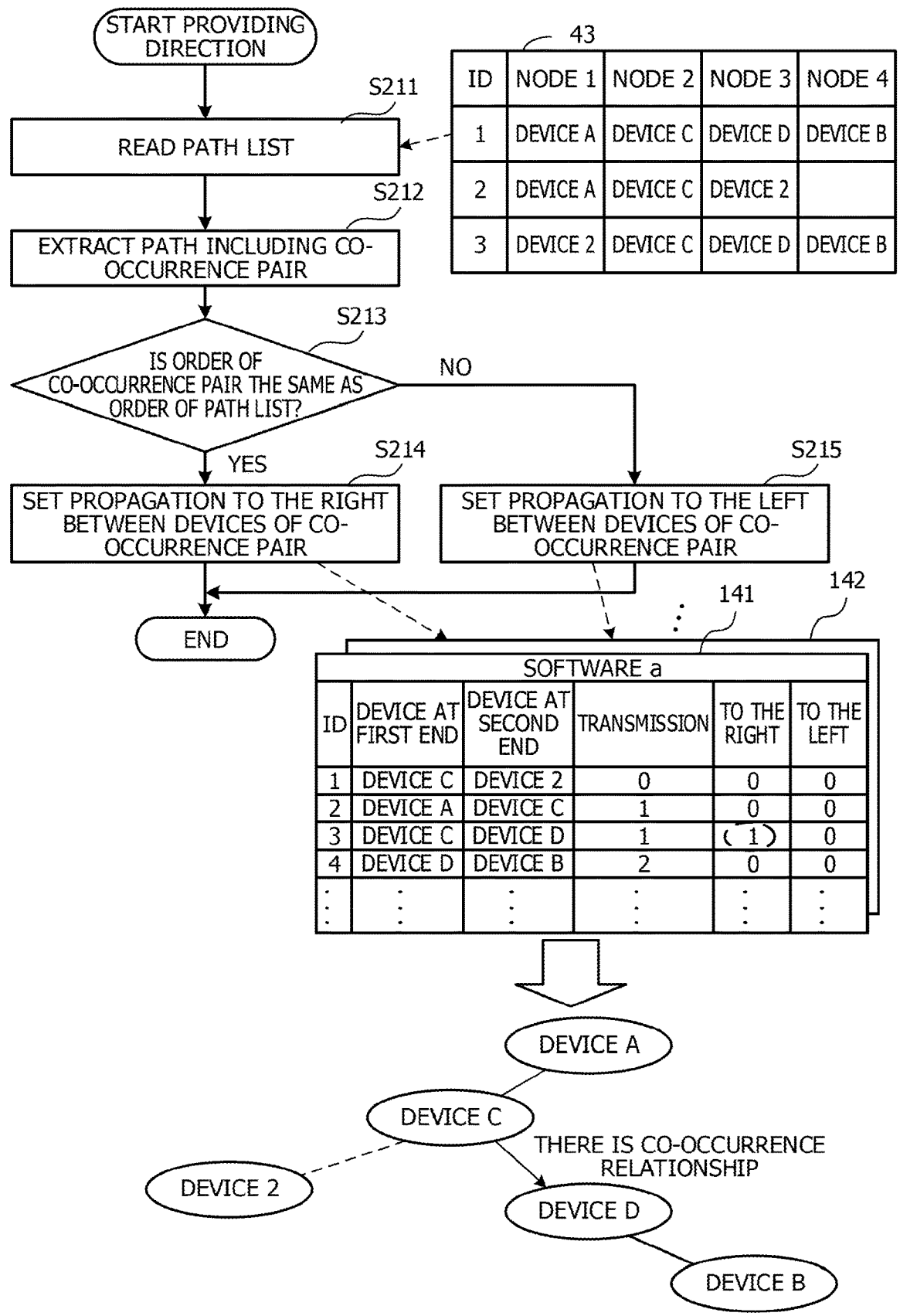
FIG. 15 is a flow chart illustrating an example of a procedure of a direction providing process.

FIG. 15 is a flow chart illustrating an example of a procedure of a direction providing process. The process illustrated in FIG. 15 will be described along with step numbers.

[S211] The influence propagation direction determining unit 132 reads the path list 43 from the memory 102.

[S212] The influence propagation direction determining unit 132 extracts a path including the co-occurrence pair selected in S206 from the path list 43.

[S213] The influence propagation direction determining unit 132 determines whether or not the order of the co-occurrence pair is the same as the order of registration in the path list 43. As for the order of the co-occurrence pair, the device set on the left in the co-occurrence list is the influencing device (first in order), and the device set on the right is the influenced device (second in order). In the path list 43, the device on the left side is the first in order, and the device on the right side is the second in order. If the orders are the same, the influence propagation direction determining unit 132 advances the process to S214. If the orders are opposite, the influence propagation direction determining unit 132 advances the process to S215.

[S214] The influence propagation direction determining unit 132 sets a value "1," which indicates there is propagation of influence, in the field of "to the right" in the record including the pair of devices corresponding to the selected co-occurrence pair in the influence propagation model regarding the same software as in the selected co-occurrence list. Subsequently, the direction providing process ends.

[S215] The influence propagation direction determining unit 132 sets a value "1," which indicates there is propagation of influence, in the field of "to the left" in the record including the pair of devices corresponding to the selected co-occurrence pair in the influence propagation model regarding the same software as in the selected co-occurrence list. Subsequently, the direction providing process ends.

In this way, the influence propagation direction upon failure is set in the influence propagation model information 141, 142, . . . . However, the determination of the influence propagation direction is based on the logs of messages output at the execution of the software, and the influence propagation direction may not be determined for a device in which the log of message of the software is not recorded. Therefore, the influence propagation direction supplementing unit 133 executes a supplementing process of the influence propagation direction. The influence propagation direction supplementing process will be described with reference to FIGS. 16 to 19.

FIG. 16 depicts an example of supplementing an influence propagation direction. FIG. 16 illustrates an information transmission path from a device A to a device B. The influence propagation direction is extracted based on the co-occurrence relationship between output messages or the like at part of the information transmission path. In the example of FIG. 16, the influence of failure is propagated in the direction from a device C to a device D.

The information is propagated to the downstream, and in the downstream of the extracted influence propagation direction, it may be estimated that the influence of failure is further propagated to the downstream. It may also be estimated that the propagation of the influence of failure ends at the end device of the information transmission path. It may be estimated that the influence of failure is not propagated on the upstream of the extracted influence propagation direction.

Therefore, the influence propagation direction supplementing unit 133 supplements the influence propagation direction toward the device on the downstream in the influence propagation direction in the path of the information transmission path in which the influence propagation directions extracted in the logs overlap. In the example of FIG. 16, the influence propagation direction from the device D to the device B is supplemented.

FIG. 17 depicts examples of supplement patterns of an influence propagation direction. In FIG. 17, the devices on the information transmission path are arranged in the order registered in the path list 43. As for the pairs of adjacent devices on the information transmission path, the device on the left in the arrangement of the path list 43 is regarded as the device at first end, and the device on the right is regarded as the device at second end when the pairs are registered in the influence propagation model information 141, 142, . . . .

When the influence propagation direction is to the right (direction from the device at first end to the device at second end) as in the case of the software named "software a," the influence propagation direction is supplemented to the right of the device at second end. When the influence propagation direction is to the left (direction from the device at second end to the device at first end) as in a case of software named "software b," the influence propagation direction is supplemented to the left of the device at first end.

The co-occurrence relationship may be detected in the same device as in a case of software named "software c" and software named "software d." In this case, the influence propagation direction is supplemented for each piece of software.

The influence of failure is propagated through, for example, communication at the execution of software. Therefore, the supplement of the influence propagation direction of software may be stopped at the device including the software. However, different pieces of software may be operating together. In that case, the influence propagates between the pieces of software operating together. Therefore, the influence propagation direction may be supplemented across a plurality of pieces of software operating together.

For example, there may be a case where software named "software e" and the software named "software d" operate together. It is assumed that the software named "software e" is implemented in a device D, a device E, and a device F, but is not implemented in a device C and a device A. On the other hand, it is assumed that the software named "software f" is implemented in the device A, the device C, and the device D. In this case, the influence propagation direction is supplemented up to the device D when it is determined that there is a co-occurrence relationship between the device F and the device E regarding the software named "software e" and that there is propagation of influence to the left. When only the software named "software e" is considered, the influence propagation direction is not supplemented for the device C and the device A not including the software. However, when there is a co-occurrence relationship between the device D and the device C regarding the software named "software f," the influence propagation direction is set based on the co-occurrence relationship, and the influence propagation direction is supplemented in a range in which the software named "software f" is implemented. The failure influence range of a plurality of pieces of software operating together may be displayed on top of each other upon failure to properly display the influence range of the failure.

Next, the influence propagation direction supplementing process will be described in detail.

Figure 18A:
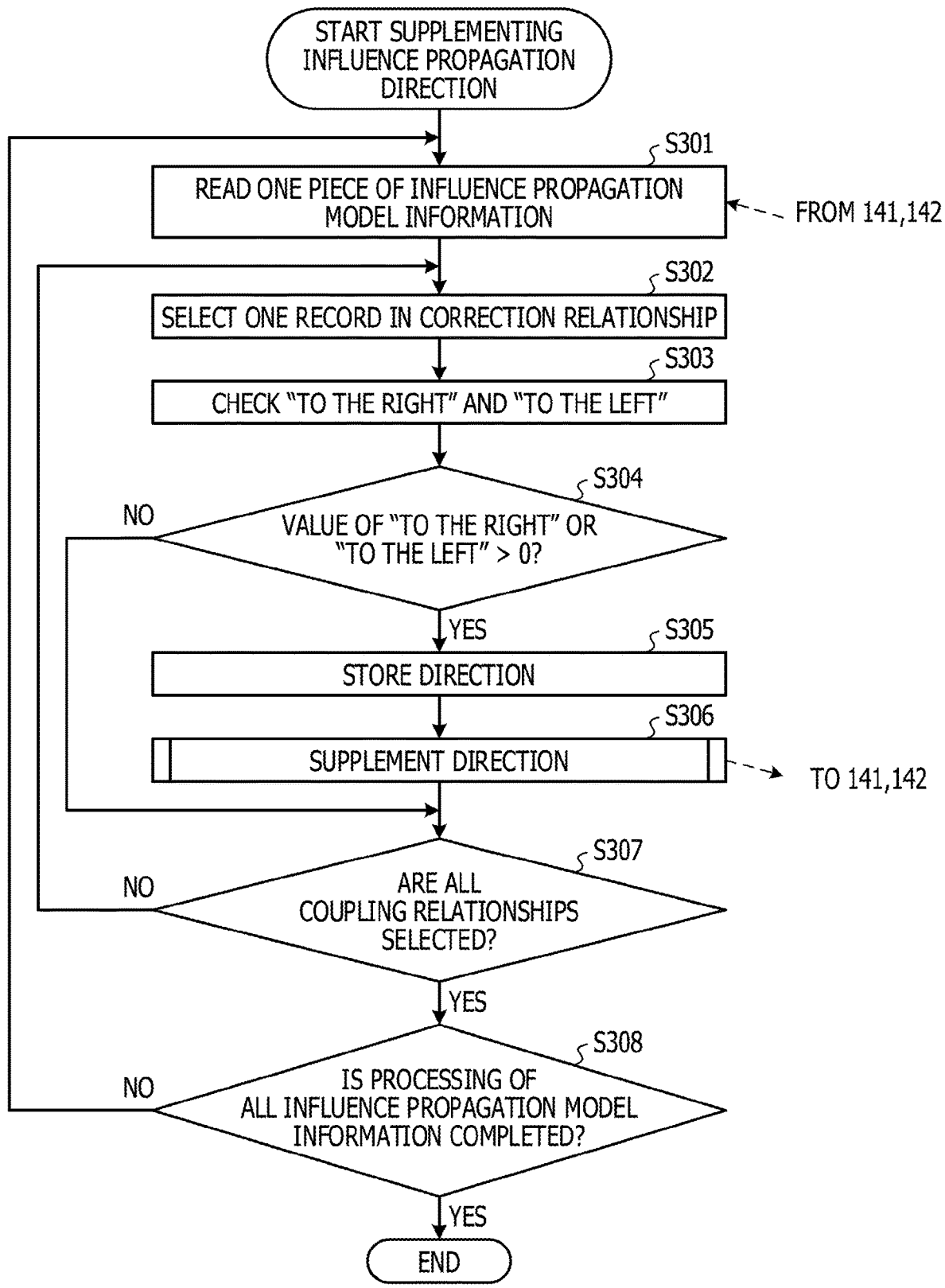

FIGS. 18A and 18B are flow charts illustrating an example of a procedure of an influence propagation direction supplementing process. The process illustrated in FIGS. 18A and 18B will be described along with step numbers.

[S301] The influence propagation direction supplementing unit 133 reads one piece of unprocessed influence propagation model information.

[S302] The influence propagation direction supplementing unit 133 selects one record indicating the coupling relationship between two devices included in the influence propagation model information.

[S303] The influence propagation direction supplementing unit 133 checks whether the influence propagation direction is to the right or to the left. For example, the influence propagation direction supplementing unit 133 acquires the value in the field of "to the right" and the value in the field of "to the left" in the selected record.

[S304] The influence propagation direction supplementing unit 133 determines whether or not one of the value in the field of "to the right" and the value in the field of "to the left" is greater than 0. If at least one of the values is greater than 0, the influence propagation direction supplementing unit 133 advances the process to S305. If both of the values are 0, the influence propagation direction supplementing unit 133 advances the process to S307.

[S305] The influence propagation direction supplementing unit 133 stores information indicating the direction of the propagation of influence (right or left) in the memory. If the value greater than 0 is set in the field of "to the right," information indicating the right is stored. If the value greater than 0 is set in the field of "to the left," information indicating the left is stored.

[S306] The influence propagation direction supplementing unit 133 executes a direction supplementing process. Details of the direction supplementing process will be described later (see FIG. 19). As a result of the direction supplementing process, the direction of the propagation of influence corresponding to the propagation of influence not detected in the co-occurrence relationship is added to the influence propagation model information 141, 142, . . . .

[S307] The influence propagation direction supplementing unit 133 determines whether or not all of the coupling relationships in the read influence propagation model information are selected. If there is an unselected coupling relationship, the influence propagation direction supplementing unit 133 advances the process to S302. If all of the coupling relationships are already selected, the influence propagation direction supplementing unit 133 advances the process to S308.

[S308] The influence propagation direction supplementing unit 133 determines whether or not processing of all of the influence propagation model information 141, 142, . . . is completed. If processing of all of the influence propagation model information 141, 142, . . . is completed, the influence propagation direction supplementing unit 133 ends the influence propagation direction supplementing process. If there is unprocessed influence propagation model information, the influence propagation direction supplementing unit 133 advances the process to S301.

Next, the direction supplementing process will be described in detail.

Figure 19:
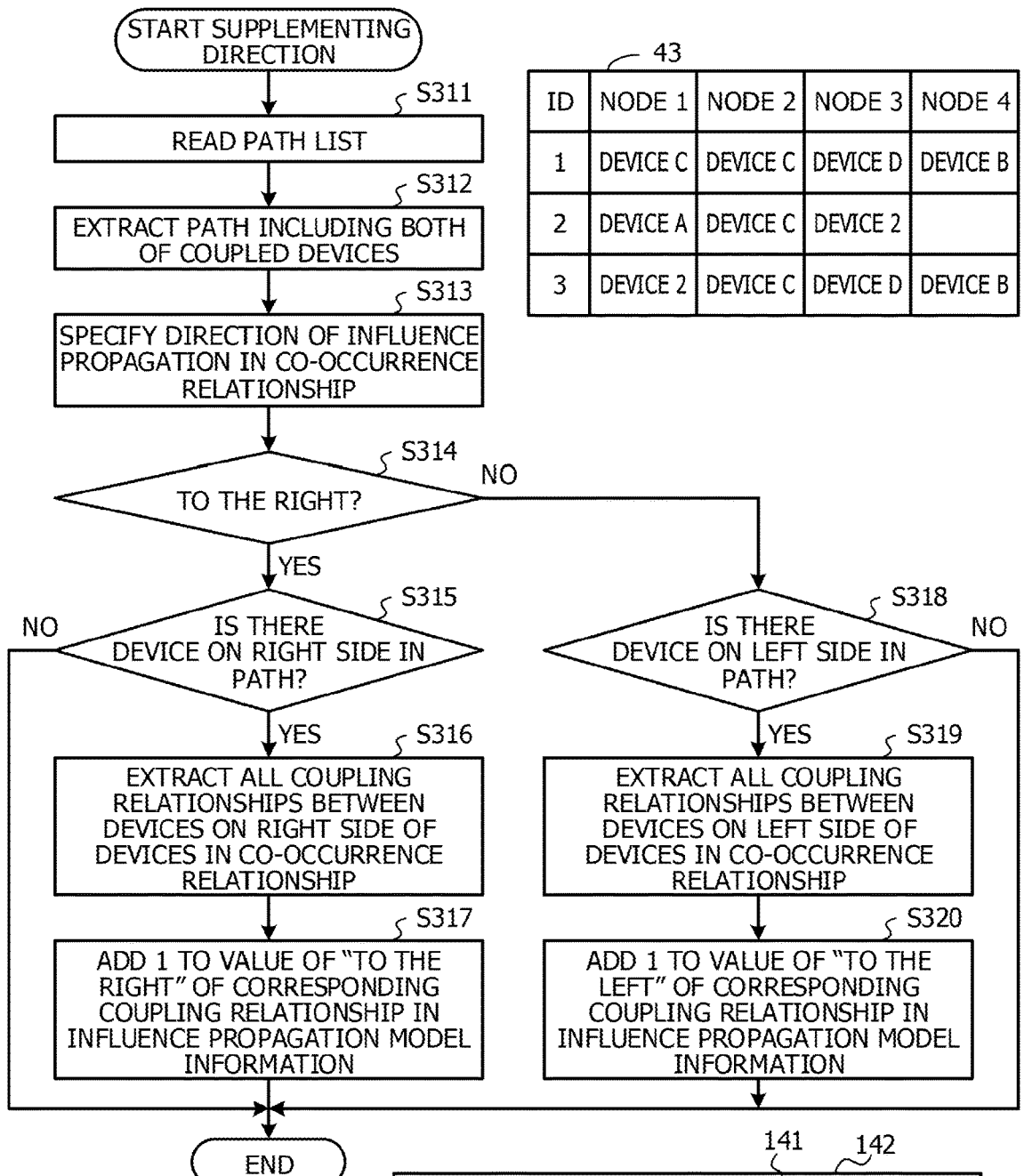
FIG. 19 is a flow chart illustrating an example of a procedure of a direction supplementing process.

FIG. 19 is a flow chart illustrating an example of a procedure of a direction supplementing process. The process illustrated in FIG. 19 will be described along with step numbers.

[S311] The influence propagation direction supplementing unit 133 reads the path list 43.

[S312] The influence propagation direction supplementing unit 133 extracts, from the path list 43, the path including both of the devices in the coupling relationship selected in S302.

[S313] The influence propagation direction supplementing unit 133 specifies the influence propagation direction of the co-occurrence relationship. The influence propagation direction is the direction indicated in the information stored in the S305.

[S314] The influence propagation direction supplementing unit 133 determines whether or not the direction of the propagation of influence is to the right. If the direction is to the right, the influence propagation direction supplementing unit 133 advances the process to S315. If the direction is to the left, the influence propagation direction supplementing unit 133 advances the process to S318.

[S315] The influence propagation direction supplementing unit 133 determines whether or not there is a device on the right side in the path extracted in S312. If there is a device on the right side, the influence propagation direction supplementing unit 133 advances the process to S316. If there is no device on the right side, the influence propagation direction supplementing unit 133 ends the direction supplementing process.

[S316] The influence propagation direction supplementing unit 133 extracts all of the coupling relationships between the devices on the right side of the devices in the co-occurrence relationship from the path extracted in S312.

[S317] The influence propagation direction supplementing unit 133 adds 1 to the value in the field of "to the right" in the record corresponding to the extracted coupling relationship in the influence propagation model information read in S301. Subsequently, the direction supplementing process ends.

[S318] The influence propagation direction supplementing unit 133 determines whether or not there is a device on the left side in the path extracted in S312. If there is a device on the left side, the influence propagation direction supplementing unit 133 advances the process to S319. If there is no device on the left side, the influence propagation direction supplementing unit 133 ends the direction supplementing process.

[S319] The influence propagation direction supplementing unit 133 extracts all of the coupling relationships between the devices on the left side of the devices in the co-occurrence relationship from the path extracted in S312.

[S320] The influence propagation direction supplementing unit 133 adds 1 to the value in the field of "to the left" in the record corresponding to the extracted coupling relationship in the influence propagation model information read in S301. Subsequently, the direction supplementing process ends.

In this way, the process of supplementing the influence propagation direction is executed. After the completion of the influence propagation direction supplementing process, the coupling relationship between adjacent devices is weighted.

Figure 20A:
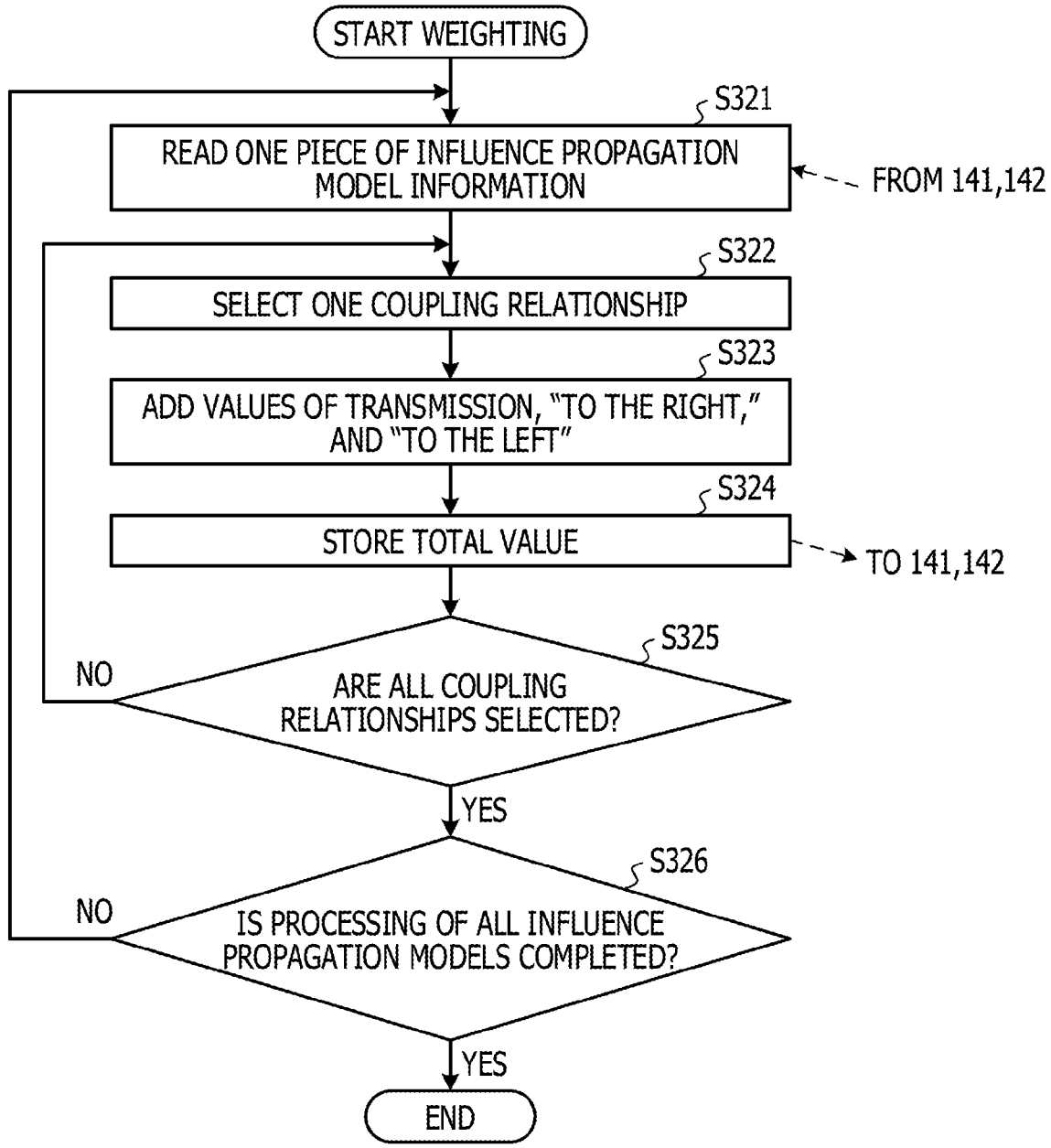
FIGS. 20A and 20B are flow charts illustrating an example of a procedure of a weighting process.
Figure 20B:
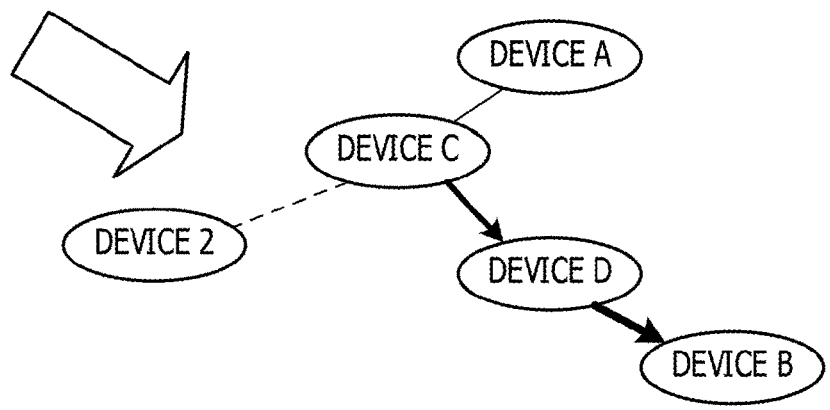

FIGS. 20A and 20B are flow charts illustrating an example of a procedure of a weighting process. The process illustrated in FIGS. 20A and 20B will be described along with step numbers.

[S321] The influence propagation direction supplementing unit 133 reads one piece of influence propagation model information.

[S322] The influence propagation direction supplementing unit 133 selects the record of one coupling relationship from the read influence propagation model information.

[S323] The influence propagation direction supplementing unit 133 adds the values in the fields of transmission, "to the right," and "to the left" in the selected record.

[S324] The influence propagation direction supplementing unit 133 stores the total value in the field of weight in the selected record.

[S325] The influence propagation direction supplementing unit 133 determines whether or not all of the coupling relationships indicated in the read influence propagation mode information are selected. If all of the coupling relationships are already selected, the influence propagation direction supplementing unit 133 advances the process to S326. If there is an unselected coupling relationship, the influence propagation direction supplementing unit 133 advances the process to S322.

[S326] The influence propagation direction supplementing unit 133 determines whether or not processing of all of the influence propagation model information is completed. If processing of all of the influence propagation model information is completed, the influence propagation direction supplementing unit 133 ends the weighting process. If there is unprocessed influence propagation model information, the influence propagation direction supplementing unit 133 advances the process to S321.

In this way, the influence propagation model information is generated. When a failure occurs in any one of the devices, the influence range of the failure is searched based on the generated influence propagation model information, and the influence range is displayed.

A failure handling supporting process upon failure will be described with reference to FIGS. 21 to 27. Upon failure, the influence range of the failure is searched to support the failure analysis.

Figure 21:
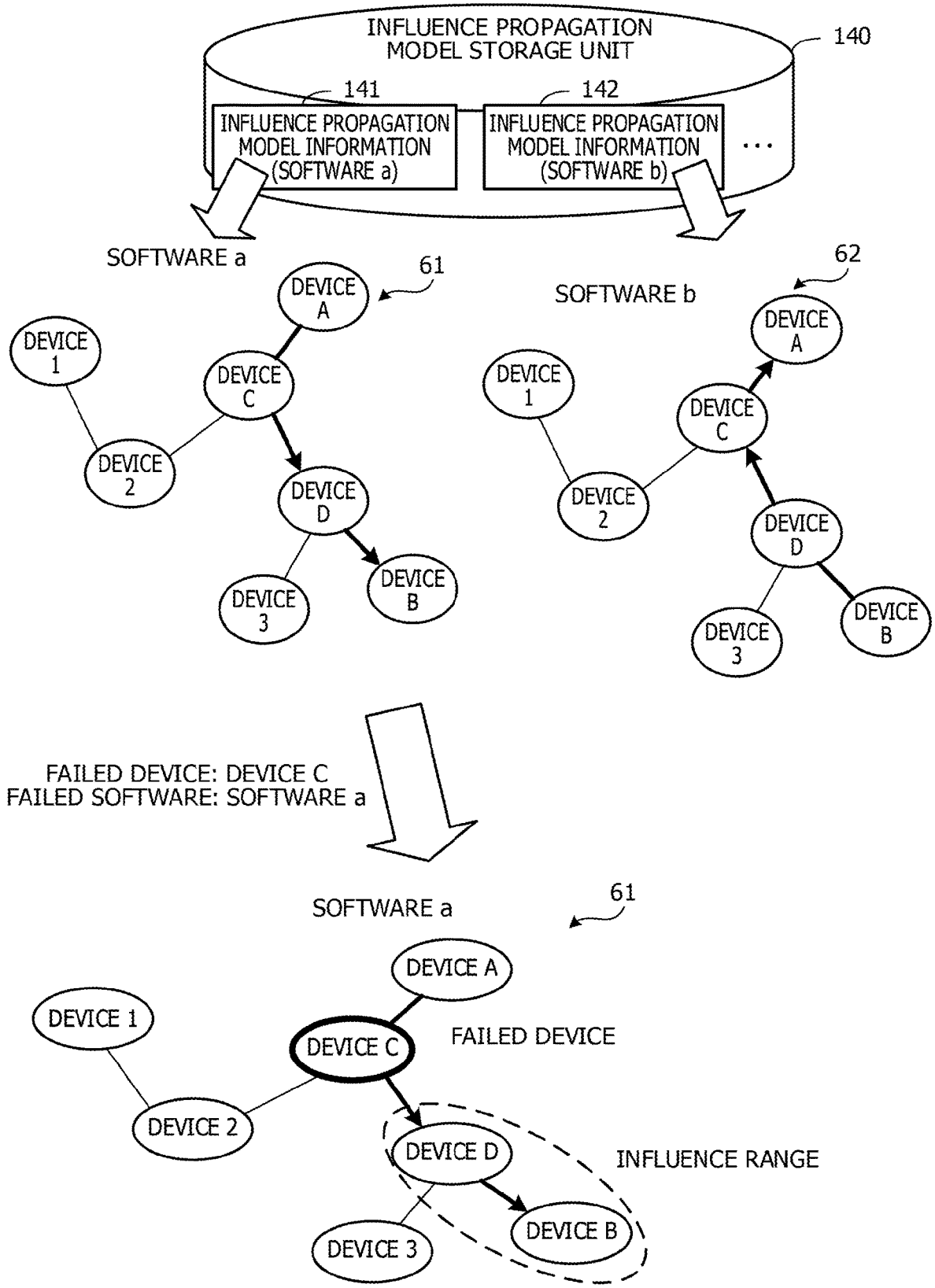
FIG. 21 depicts an example of searching an influence range upon failure.

FIG. 21 depicts an example of searching an influence range upon failure. The influence propagation model information 141, 142, . . . corresponding to the pieces of software is stored in the influence propagation model storage unit 140. For example, the influence propagation model information 141 represents an influence propagation model 61 of the software named "software a." The influence propagation model information 142 represents an influence propagation model 62 of the software named "software b."

For example, when a failure regarding "software a" occurs in the device C, the failure information collecting unit 150 acquires information regarding the failure, and the influence range searching unit 160 searches the influence range of the failure. The influence range display unit 170 then displays the influence propagation model 61 indicating the influence range of the failure. By displaying the influence propagation model 61, the administrator may take measures for the devices in descending order of influence and efficiently take measures against the failure.

There may be other software operating together with the software in which the failure is detected. In that case, the influence propagation model displays the influence ranges corresponding to the pieces of software.

Figure 22:
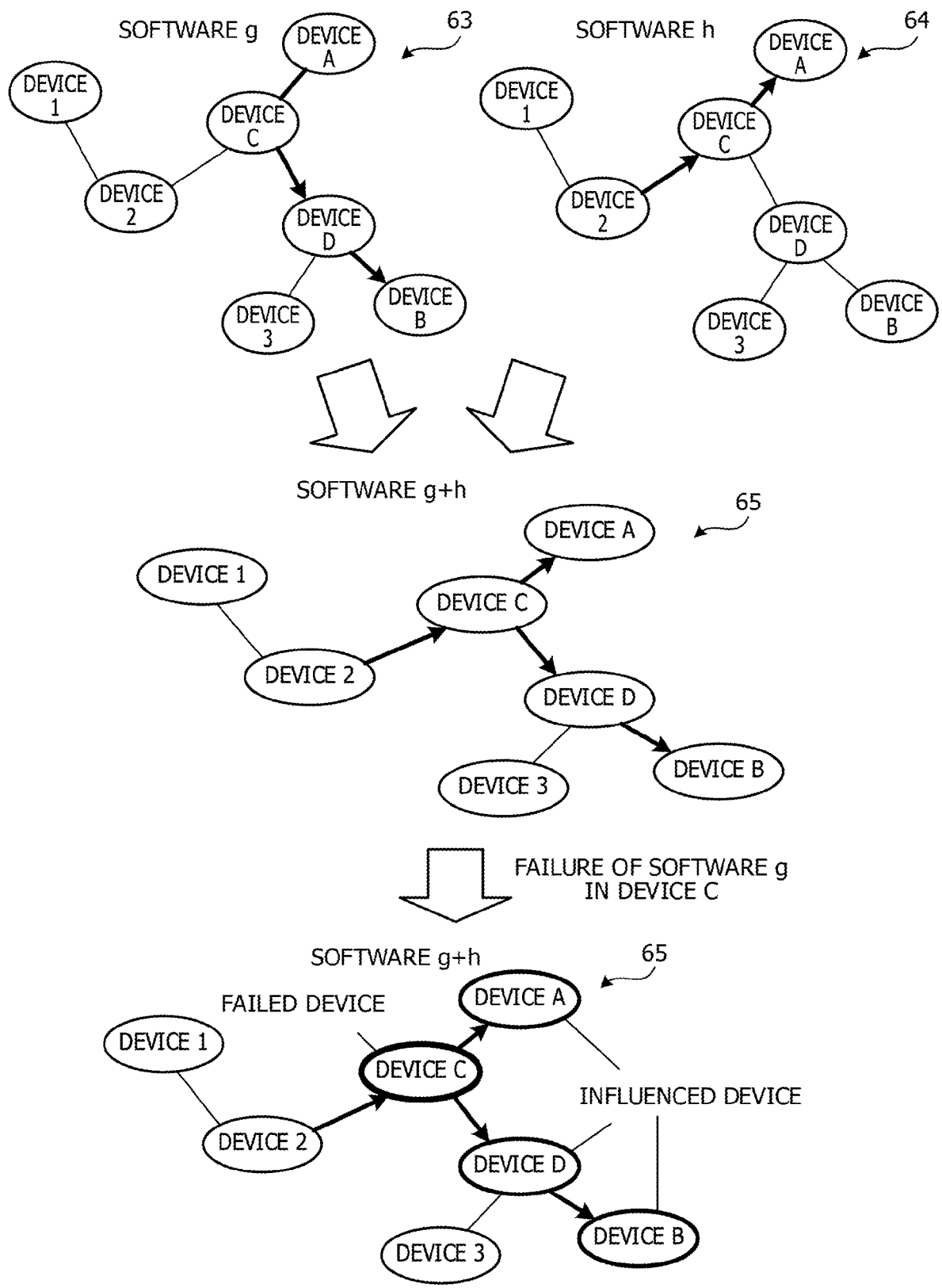
FIG. 22 depicts an example of an influence propagation model when a plurality of pieces of software operate together.

FIG. 22 depicts an example of an influence propagation model when a plurality of pieces of software operate together. For example, it is assumed that software named "software g" and software named "software h" operate together. When a plurality of pieces of software operate together, the propagation directions of influence in influence propagation models 63 and 64 corresponding to the pieces of software are integrated to generate an influence propagation model 65. Upon failure, the influence propagation model 65 is used to display the influence range of the failure.

When the influence propagation model 65 reflecting the propagation of influence of a plurality of pieces of software is not generated upon failure, the influence propagation direction supplementing unit 133 uses the plurality of directions corresponding to the pieces of software to supplement the influence propagation direction again to generate the influence propagation model 65 of the plurality of pieces of software.

Next, the procedure of the failure handling supporting process will be described in detail.

Figure 23:
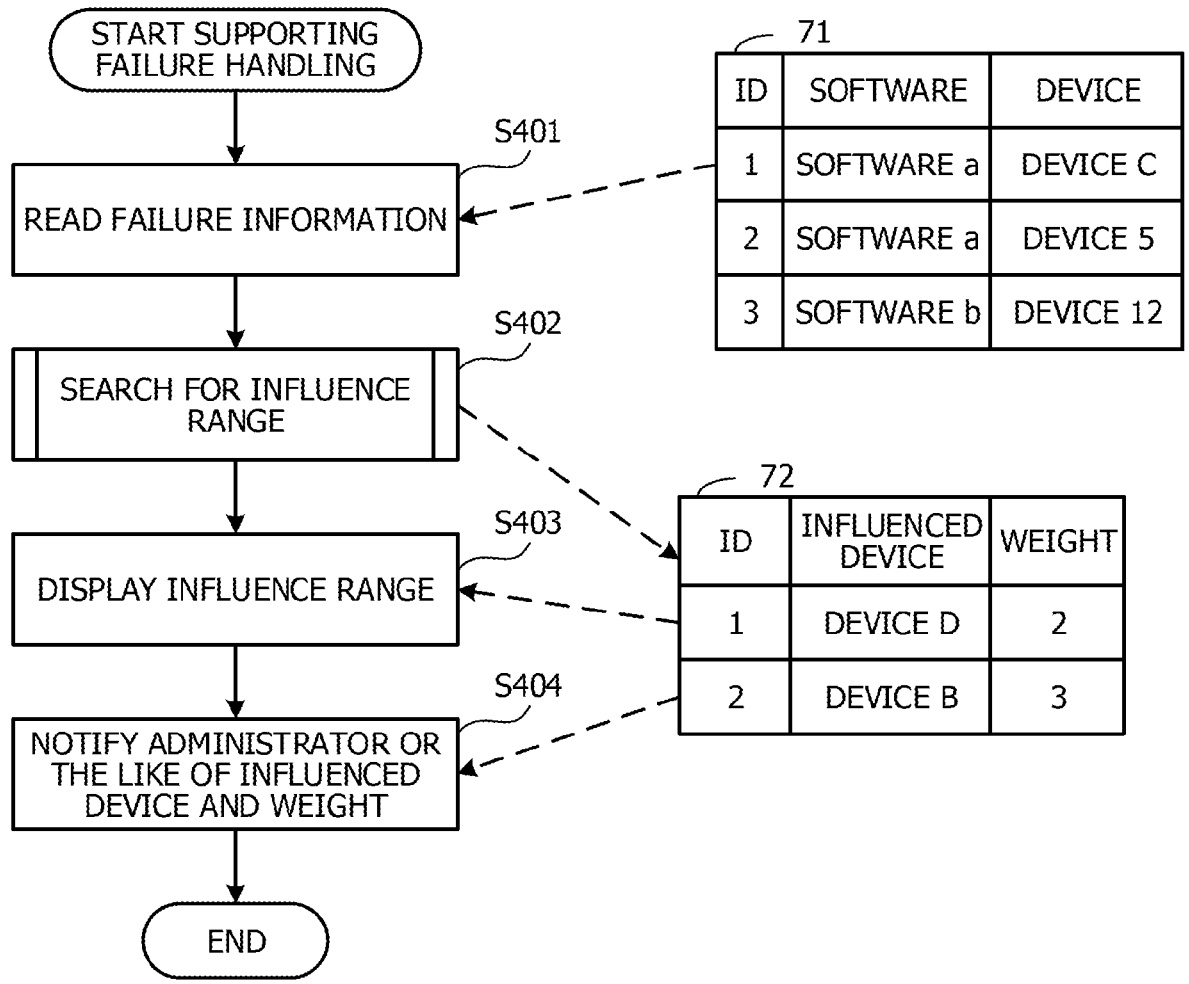
FIG. 23 is a flow chart illustrating an example of a procedure of a failure handling supporting process.
Figure 24A:
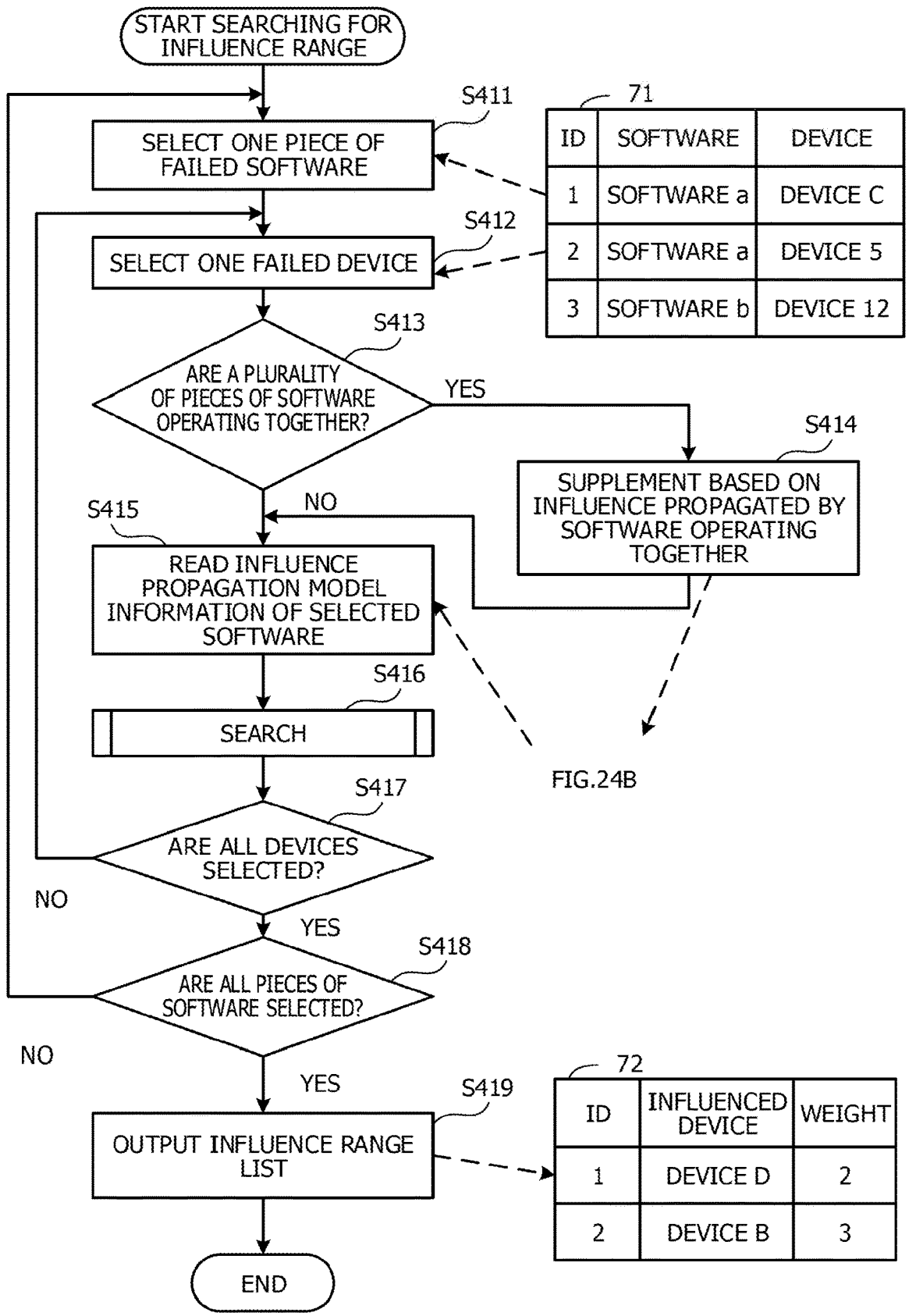
Figure 25A:
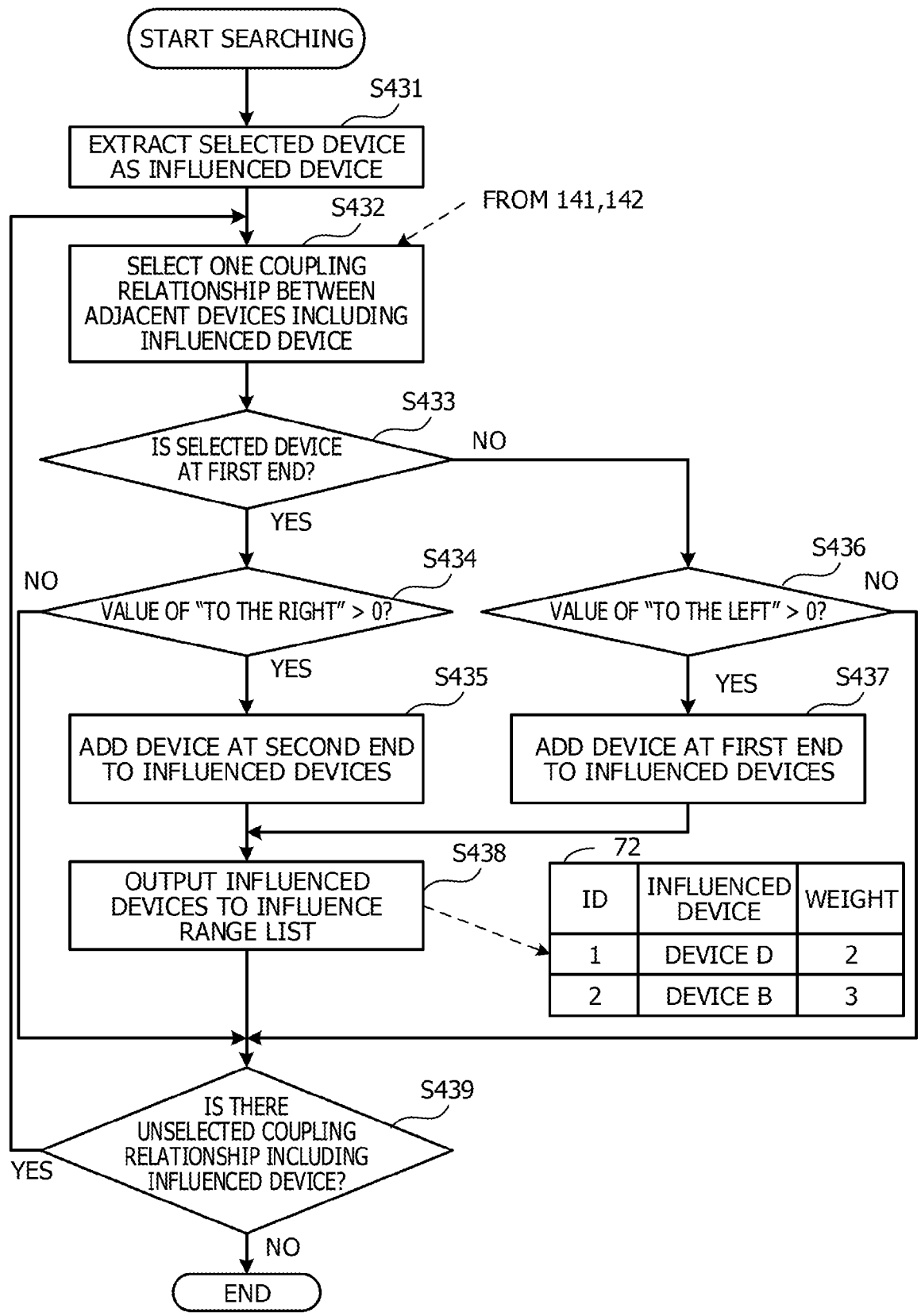

FIG. 23 is a flow chart illustrating an example of a procedure of a failure handling supporting process. The failure handling supporting process is executed, for example, when occurrence of failure is automatically detected or when the user inputs failure occurrence information. The process illustrated in FIG. 23 will be described along with step numbers.

[S401] The influence range searching unit 160 reads failure information 71 stored in a failure information supplement folder designated in advance. The failure information 71 is, for example, acquired by the failure information collecting unit 150 from the monitoring server 30 and stored in the failure information supplement folder. In the failure information 71, the name of the software with the failure and the name of the device with the failure are set for each identifier (ID) of the failure, for example.

[S402] After acquiring the failure information 71, the influence range searching unit 160 searches for the influence range of the failure indicated in the failure information 71. Details of the influence range searching process will be described later (see FIGS. 24A and 24B). As a result of the influence range searching process, an influence range list 72 is generated. The devices influenced by the failure (influenced devices) and the weights of the influence of the devices are set in the influence range list 72.

[S403] The influence range display unit 170 displays the influence range of the failure on the monitor 21 based on the influence range list 72. For example, the influence range display unit 170 displays an influence propagation model representing a drawing of the content indicated in the influence range list 72. The thickness of the coupling line between nodes in the influence propagation model displayed by the influence range display unit 170 corresponds to the weight of the device on the downstream of the propagation of influence passing through the coupling line, for example.

[S404] The influence range display unit 170 notifies the user, such as the administrator, of the device influenced by the failure and the weight. For example, the influence range display unit 170 notifies the user of the identifier of the device with the weight equal to or greater than a given value as a device likely to be influenced by the failure.

Next, the influence range searching process will be described.

FIG. 24 is a flow chart illustrating an example of a procedure of an influence range searching process. The process illustrated in FIG. 24 will be described along with step numbers.

[S411] The influence range searching unit 160 selects one piece of software with a failure from the failure information 71.

[S412] The influence range searching unit 160 selects one device with a failure regarding the selected software from the failure information 71.

[S413] The influence range searching unit 160 determines whether or not a plurality of pieces of software operate together. For example, the influence range searching unit 160 determines that a plurality of pieces of software operate together when there is another piece of software designated in advance as software operating together with the selected software. If a plurality of pieces of software operate together, the influence range searching unit 160 advances the process to S414. If a plurality of pieces of software do not operate together, the influence range searching unit 160 advances the process to S415.

[S414] The influence range searching unit 160 supplements the influence propagation model information of the selected software based on the influence propagated by the other software operating together with the selected software. For example, the influence range searching unit 160 adds the values, which are set in the corresponding record in the influence propagation model information of the other software with a failure operating together, to the fields of transmission, "to the right," "to the left," and weight in each record of the influence propagation model information of the selected software.

[S415] The influence range searching unit 160 reads the influence propagation model information of the selected software.

[S416] The influence range searching unit 160 traces the coupling relationship from the device with the failure and searches for the device influenced by the failure. Details of the searching process will be described later (see FIGS. 25A and 25B).

[S417] The influence range searching unit 160 determines whether or not all of the devices in which the selected software is failed are selected. If all of the devices are already selected, the influence range searching unit 160 advances the process to S418. If there is an unprocessed device, the influence range searching unit 160 advances the process to S412.

[S418] The influence range searching unit 160 determines whether or not all of the pieces of software with failures are selected. If all of the pieces of software are already selected, the influence range searching unit 160 advances the process to S419. If there is an unselected piece of software, the influence range searching unit 160 advances the process to S411.

[S419] The influence range searching unit 160 outputs, as an influence range search result, the influence range list 72 indicating the influence range searched in the searching process (S416).

Next, the searching process will be described in detail.

FIG. 25 is a flow chart illustrating an example of a procedure of a searching process. The process illustrated in FIG. 25 will be described along with step numbers.

[S431] The influence range searching unit 160 sets the device selected in S412 as an influenced device.

[S432] The influence range searching unit 160 selects one coupling relationship between adjacent devices (set of device at first end and device at second end) including the influenced device from the influence propagation model information of the software selected in S411.

[S433] The influence range searching unit 160 determines whether or not the selected device is the device at first end in the coupling relationship. If the selected device is the device at first end, the influence range searching unit 160 advances the process to S434. If the selected device is the device at second end, the influence range searching unit 160 advances the process to S436.

[S434] The influence range searching unit 160 determines whether or not the value in the field of "to the right" in the record of the selected coupling relationship is greater than 0. If the value in the field of "to the right" is greater than 0, the influence range searching unit 160 advances the process to S435. If the value in the field of "to the right" is 0, the influence range searching unit 160 advances the process to S439.

[S435] The influence range searching unit 160 adds the device at second end in the selected coupling relationship to the influenced devices. The influence range searching unit 160 then advances the process to S438.

[S436] The influence range searching unit 160 determines whether or not the value in the field of "to the left" in the record of the selected coupling relationship is greater than 0. If the value in the field of "to the left" is greater than 0, the influence range searching unit 160 advances the process to S437. If the value in the field of "to the left" is 0, the influence range searching unit 160 advances the process to S439.

[S437] The influence range searching unit 160 adds the device at first end in the selected coupling relationship to the influenced devices.

[S438] The influence range searching unit 160 outputs the influenced devices and the weights of the records including the coupling relationship as a source of extracting the influenced devices to the influence range list 72.

[S439] The influence range searching unit 160 determines whether or not there is an unselected coupling relationship including an influenced device in the influence propagation model information of the selected software. If there is an unselected coupling relationship, the influence range searching unit 160 advances the process to S432. If there is no unselected coupling relationship, the influence range searching unit 160 ends the searching process.

In this way, the influence range of the failure is displayed in the failure handling supporting process upon failure.

FIG. 26 depicts an example of displaying an influence range of failure. FIG. 26 illustrates a network configuration display screen 81 without a failure and a network configuration display screen 82 after a failure. In the example of FIG. 26, a failure occurs in the device A. The network configuration display screen 82 illustrates the propagation of influence of the failure to the device C, the device D, and the device B. The weight of the influence regarding the influenced device is expressed by the thickness of the arrow coupled to the device.

As a result of the display, the administrator may accurately figure out the devices influenced by the failure. Moreover, the weight of the influence is expressed by the thickness of the line coupling the devices, and the administrator may preferentially take measures for a significantly influenced device. As a result, measures may be efficiently taken against the failure, and the negative influence of the failure on the system operation may be reduced.

When the influence is propagated due to cooperative operation of a plurality of pieces of software, the influence propagation range is displayed by integrating the influence.

Figure 27:
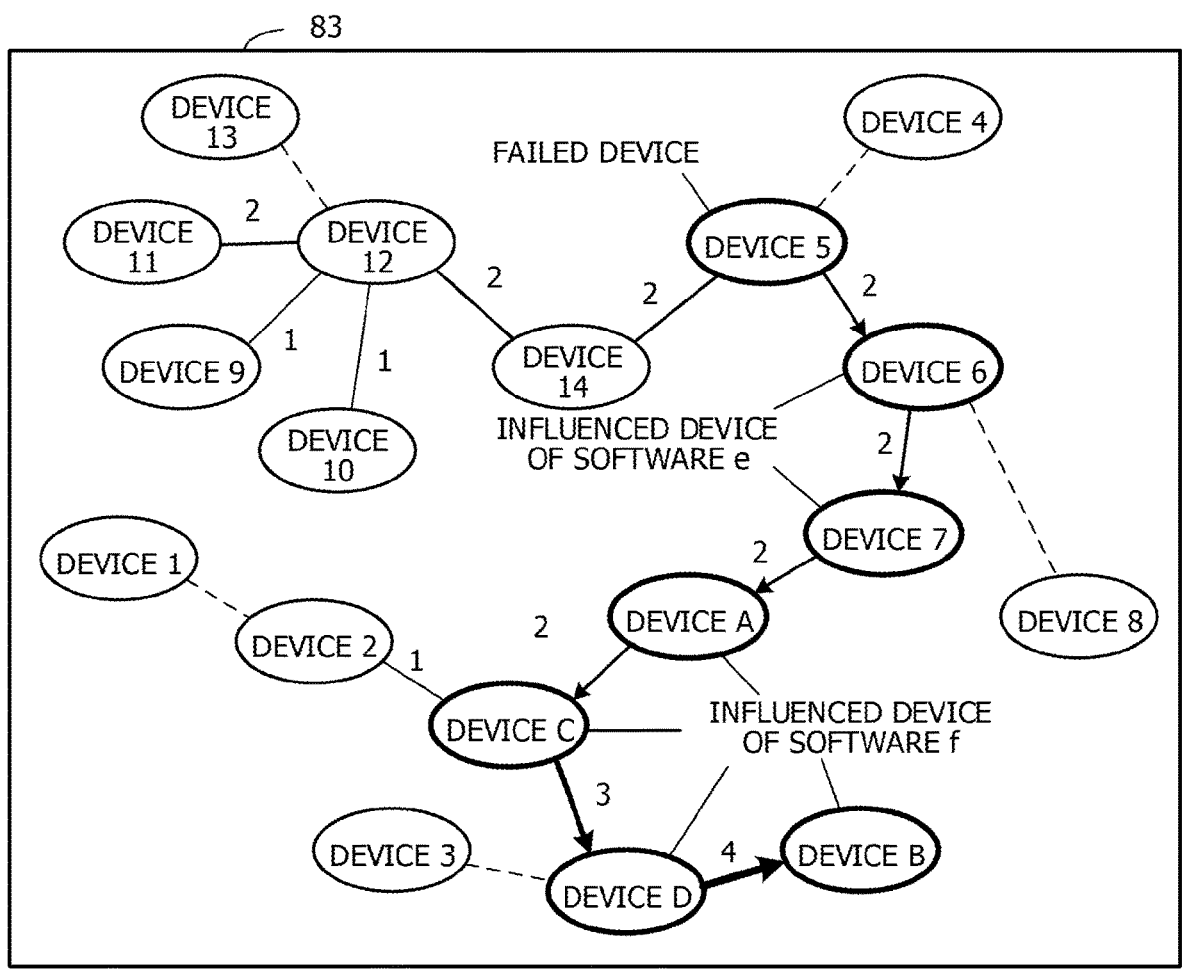
FIG. 27 depicts an example of displaying an influence propagation range when a plurality of pieces of software operate together.

FIG. 27 depicts an example of displaying an influence propagation range when a plurality of pieces of software operate together. In the example of FIG. 27, the devices influenced by the software named "software e" and the devices influenced by the software named "software f" are highlighted in a network configuration display screen 83. As a result, the user may easily recognize that the influence is propagated due to the cooperative operation of a plurality of pieces of software and that the devices up to the device B are influenced by the failure in the device 5.

Although the embodiments have been illustrated, the configuration of each element illustrated in the embodiments may be replaced with another configuration with a similar function. Alternatively, other arbitrary components or processes may be added. Furthermore, two or more arbitrary configurations (features) in the embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

determining a communication path between two devices with a correlation in use status of resources as an information transmission path based on system configuration information indicating a coupling relationship between a plurality of devices included in a network and based on use resource information indicating temporal variation in the use status of the resources of each of the plurality of devices;

generating, for each of a plurality of software, an influence propagation model in which a direction from a first device on the information transmission path to a second device adjacent to the first device is set as an influence propagation direction of a failure of the software in the information transmission path, when a co-occurrence probability indicating a probability that the second device outputs a message through execution of the software within a certain time after the first device outputs a message through execution of the software is equal to or greater than a threshold, based on a message log generated by accumulating a plurality of messages output by the plurality of devices after executing each of the plurality of software;

acquiring failure information indicating a failed device in which a failure occurs in one of software among the plurality of software;

specifying, as an influenced device influenced by the failure in the failed device, a device reached by tracing the information transmission path from the failed device in the influence propagation direction indicated in the influence propagation model of the one of software; and outputting information indicating the influenced device.

2. The storage medium according to claim 1, wherein the generating the influence propagation model includes:
  setting a propagation direction from the first device to a direction of the second device, for a first adjacent coupling relationship that is a coupling relationship between the first device and the second device on the influence propagation model; and
  tracing the information transmission path in a direction opposite the first device from the second device and setting a propagation direction in the traced direction for a second adjacent coupling relationship that is a coupling relationship on the influence propagation model between devices on the traced path.

3. The storage medium according to claim 1, wherein
  the generating the influence propagation model includes:
    setting, for each of a plurality of adjacent coupling relationships indicating coupling relationships between adjacent devices on the influence propagation model, a weight according to the number of information transmission paths passing through the adjacent coupling relationship, and
  the outputting includes outputting information indicating the weight of the adjacent coupling relationship.

4. The storage medium according to claim 1, wherein the specifying the influenced device includes specifying the influenced device from the influence propagation model of each of two or more software when the failure information regarding a failure related to the two or more software is acquired.

5. An influence range specifying method executed by a processor included in an influence range specifying apparatus, the influence range specifying method comprising:
  determining a communication path between two devices with a correlation in use status of resources as an information transmission path based on system configuration information indicating a coupling relationship between a plurality of devices included in a network and based on use resource information indicating temporal variation in the use status of the resources of each of the plurality of devices;
  generating, for each of a plurality of software, an influence propagation model in which a direction from a first device on the information transmission path to a second device adjacent to the first device is set as an influence propagation direction of a failure of the software in the information transmission path, when a co-occurrence probability indicating a probability that the second device outputs a message through execution of the software within a certain time after the first device outputs a message through execution of the software is equal to or greater than a threshold, based on a message log generated by accumulating a plurality of messages output by the plurality of devices after executing each of the plurality of software;
  acquiring failure information indicating a failed device in which a failure occurs in one of software among the plurality of software;
  specifying, as an influenced device influenced by the failure in the failed device, a device reached by tracing the information transmission path from the failed device in the influence propagation direction indicated in the influence propagation model of the one of software; and
  outputting information indicating the influenced device.

6. An influence range specifying apparatus, comprising:
  a memory; and
  a processor coupled to the memory and configured to:
    store system configuration information indicating a coupling relationship between a plurality of devices included in a network, use resource information indicating temporal variation in use status of resources of each of the plurality of devices, and a message log generated by accumulating a plurality of messages output by the plurality of devices after executing each of the plurality of software,
    determine a communication path between two devices with a correlation in the use status of the resources as an information transmission path based on the system configuration information and the use resource information of each of the plurality of devices and
    generate, for each of the plurality of software, an influence propagation model in which a direction from a first device on the information transmission path to a second device adjacent to the first device is set as an influence propagation direction of a failure of the software in the information transmission path, when a co-occurrence probability indicating a probability that the second device outputs a message through execution of the software within a certain time after the first device outputs a message through execution of the software is equal to or greater than a threshold, based on the message log,
    acquire failure information indicating a failed device in which a failure occurs in one of software among the plurality of software,
    specify, as an influenced device influenced by the failure in the failed device, a device reached by tracing the information transmission path from the failed device in the influence propagation direction indicated in the influence propagation model of the one of software, and
    output information indicating the influenced device.

7. The influence range specifying apparatus according to claim 6, wherein the processor is configured to:
  set a propagation direction from the first device to a direction of the second device, for a first adjacent coupling relationship that is a coupling relationship between the first device and the second device on the influence propagation model, and
  trace the information transmission path in a direction opposite the first device from the second device and setting a propagation direction in the traced direction for a second adjacent coupling relationship that is a coupling relationship on the influence propagation model between devices on the traced path.

8. The influence range specifying apparatus according to claim 6, wherein the processor is configured to:
  set, for each of a plurality of adjacent coupling relationships indicating coupling relationships between adjacent devices on the influence propagation model, a weight according to the number of information transmission paths passing through the adjacent coupling relationship, and
  output information indicating the weight of the adjacent coupling relationship.

9. The influence range specifying apparatus according to claim 6, wherein the processor is configured to specify the influenced device from the influence propagation model of each of two or more software when the failure information regarding a failure related to the two or more software is acquired.

* * * * *